(12) United States Patent
Ishimoto

(10) Patent No.: US 9,164,226 B2
(45) Date of Patent: Oct. 20, 2015

(54) ILLUMINATION DEVICE, DISPLAY DEVICE, AND TELEVISION RECEPTION DEVICE

(75) Inventor: Yoshitake Ishimoto, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 131 days.

(21) Appl. No.: 14/004,667

(22) PCT Filed: Mar. 9, 2012

(86) PCT No.: PCT/JP2012/056074
§ 371 (c)(1),
(2), (4) Date: Sep. 11, 2013

(87) PCT Pub. No.: WO2012/128064
PCT Pub. Date: Sep. 27, 2012

(65) Prior Publication Data
US 2013/0342766 A1 Dec. 26, 2013

(30) Foreign Application Priority Data
Mar. 18, 2011 (JP) ................. 2011-061079

(51) Int. Cl.
H04N 5/64 (2006.01)
F21V 8/00 (2006.01)
(Continued)

(52) U.S. Cl.
CPC ............ *G02B 6/0081* (2013.01); *G02B 6/0085* (2013.01); *G02F 1/1336* (2013.01); *G02F 1/133308* (2013.01); *H04N 5/64* (2013.01);
(Continued)

(58) Field of Classification Search
CPC ............ G02F 1/133308; G02F 1/1336; G02F 1/133615; G02F 1/13624; G02F 2201/54;
G02F 2201/32; G02F 2201/36; G02F 2001/133628; G02F 2001/133314; G02B 6/0081; G02B 6/0085; G02B 6/0091; G02B 6/0083; H04N 5/64
USPC ......... 362/23.16–23.17, 97.1–97.4, 600–634; 348/790, 739
See application file for complete search history.

(56) References Cited

U.S. PATENT DOCUMENTS 7,175,329 B1 * 2/2007 Chou ............................ 362/612
8,033,708 B2 * 10/2011 Tsubaki ....................... 362/612
(Continued)

FOREIGN PATENT DOCUMENTS

CN 201696950 U * 1/2011
JP 2009-169204 A 7/2009

*Primary Examiner* — Anh Mai
*Assistant Examiner* — Arman B Fallahkhair
(74) *Attorney, Agent, or Firm* — Chen Yoshimura LLP

(57) ABSTRACT

The illumination device 10 according to the present invention includes: a housing member 22 having a bottom plate 22a and a side wall 22b; a light guide plate 26 disposed on the inside of the side wall 22b in a manner so that a gap is formed between the side wall 22b and the side edge face 26b of the light guide plate 26; a light source unit having a light source 24 and a light source substrate 25 and disposed in the gap in a manner so that the substrate surface 25a faces the side edge face 26b; an optical sheet 23 disposed on the front surface 26a side of the light guide plate 26 and having an outer edge 23d protruding towards the light source substrate 25 from the side edge face 26b in a manner so as to cover and hide the bottom plate 22a at the section where the gap is; and a circulation hole X that pierces the light source substrate 25 or the housing member 22 in a manner such that the outside communicates with the air space S1 enclosed by the side edge face 26b, the substrate surface 25a, the bottom plate 22a, and the outer edge 23d.

8 Claims, 32 Drawing Sheets

(51) Int. Cl.
*G02F 1/1333* (2006.01)
*G02F 1/1335* (2006.01)
*G02F 1/1362* (2006.01)

(52) U.S. Cl.
CPC ............. *G02B 6/0083* (2013.01); *G02B 6/0091* (2013.01); *G02F 1/13624* (2013.01); *G02F 1/133608* (2013.01); *G02F 1/133615* (2013.01); *G02F 2001/133314* (2013.01); *G02F 2001/133628* (2013.01); *G02F 2201/36* (2013.01); *G02F 2201/52* (2013.01); *G02F 2201/54* (2013.01)

(56) References Cited

U.S. PATENT DOCUMENTS

| | | | | |
|---|---|---|---|---|
| 8,147,113 | B2* | 4/2012 | Hamada | 362/631 |
| 8,154,702 | B2* | 4/2012 | Kim | 349/150 |
| 8,297,827 | B2* | 10/2012 | Huang et al. | 362/612 |
| 8,459,857 | B2* | 6/2013 | Shibata et al. | 362/613 |
| 8,767,140 | B2* | 7/2014 | He | 349/58 |
| 2011/0134346 | A1* | 6/2011 | Hayashi et al. | 348/790 |
| 2013/0135537 | A1* | 5/2013 | Kuromizu | 348/790 |

* cited by examiner

ILLUMINATION DEVICE, DISPLAY DEVICE, AND TELEVISION RECEPTION DEVICE

TECHNICAL FIELD

The present invention relates to an illumination device, a display device, and a television receiver.

BACKGROUND ART

In recent years, liquid crystal panels are in general use as the display part for televisions, mobile telephones, personal digital assistants, and the like. Liquid crystal panels cannot emit light on their own, and thus, in order to display images, light from an illumination device (the so-called backlight) is used. This illumination device is disposed on the rear surface side of the liquid crystal panel, and is configured so as to radiate light spread in a planar manner towards the rear surface of the liquid crystal panel.

As the illumination device, a type including a light guide plate and a light source unit disposed facing an edge face of the light guide plate is known (Patent Document 1, for example). This type of illumination device is generally known as the side light type (or edge light type), and as the light source unit, a light source unit constituted of a plurality of LEDs and an LED substrate upon which these LEDs are mounted is used, for example. As light from the respective LEDs mounted on the LED substrate is radiated towards a side edge face of the light guide plate, this light enters the light guide plate at the side edge face, and travels inside the light guide plate while being reflected by a reflective sheet or the like disposed below the light guide plate. This light is outputted as planar light from the front surface of the light guide plate. The light emitted from the front surface of the light guide plate passes through optical sheets made of a transparent resin and disposed on the front surface of the light guide plate, and illuminates the liquid crystal panel from the rear thereof. The size of the optical sheets is generally set such that the front surface of the light guide plate can be covered.

RELATED ART DOCUMENT

Patent Document

Patent Document 1: Japanese Patent Application Laid-Open Publication No. 2009-169204

Problems to be Solved by the Invention

As optical sheets, a type in which the outer edge thereof covers the gap between the LED substrate and the light guide plate from above protruding outward from the light guide plate is known. If an illumination device provided with such optical sheets is illuminated, then heat emitted from the LEDs or the like heats this gap, and the outer edges of the optical sheets covering the gaps from above are also heated, and undergo thermal expansion.

If the outer edges of the optical sheets thermally expand, the outer edges spread outwards and hit the LED substrates and the like, and are pressed back by the LED substrate and the like. If this happens, deformations such as wrinkling and warping occur in the outer edge, which then serve as a starting point for deformations that reach the middle portion of the optical sheets such as large wrinkles and warping.

SUMMARY OF THE INVENTION

An object of the present invention is to provide an illumination device and the like in which thermal expansion in the outer edges is mitigated, thus mitigating deformations such as wrinkling and warping in the optical sheets.

Means for Solving the Problems

An illumination device of the present invention includes: a housing member having a bottom plate and side walls that rise up from the bottom plate; a light guide plate having a front surface from which light inputted from a side edge face of the light guide plate is outputted, and a rear surface that faces the bottom plate of the housing member, the light guide plate being disposed on an inner side of the side walls such that a space is formed between the side edge face of the light guide plate and one of the side walls of the housing member facing the side edge face; a light source unit provided with light sources and a light source substrate having the light sources mounted on a substrate surface thereof, the substrate surface facing the side edge face of the light guide plate, the light source unit being disposed in the space such that a gap is formed between the substrate surface of the light source substrate and the side edge face; and an optical sheet disposed on the front surface of the light guide plate, the optical sheet having an outer edge that protrudes from the side edge face of the light guide plate in a plan view towards the light source substrate to cover the bottom plate at the gap, wherein a circulation hole is formed in at least one of the light source substrate and the housing member such that an air space surrounded by the side edge face of the light guide plate, the substrate surface of the light source substrate, the bottom plate of the housing member, and the outer edge of the optical sheet communicates with an outside of the illumination device. The illumination device includes a circulation hole through at least one of the light source substrate and the housing member such that the air space and the outside communicate, and thus, the air inside the air space and the outside air can be exchanged, thus mitigating an increase in temperature inside the air space. As a result, thermal expansion in the outer edge of the optical sheet is mitigated, thus mitigating wrinkling, warping, and the like in the optical sheet.

The illumination device may include: a first support member that includes a flat first attaching part fixed onto the bottom plate such that a front end of the first attaching part is interposed between the bottom plate and the light guide plate and a rear end of the first attaching part is disposed within the space between the one of the side walls and the side edge face, and a flat first standing wall that rises from the rear end of the first attaching part, the first standing wall having the light source substrate fixed thereto, thereby allowing the light source unit to be disposed within the space, wherein the circulation hole is formed either through the light source substrate, the first standing wall, and the one of the side walls, or through the first attaching part and the bottom plate.

The illumination device may be configured such that if the circulation hole is formed through the light source substrate, the first standing wall, and the one of the side walls, then a first section formed through the light source substrate and the first standing wall, and a second section formed through the one of the side walls do not match each other in position when viewed from a direction of penetration. In the illumination device, the first section and the second section do not match each other in position when viewed from the axis direction of the circulation hole, and thus, it becomes difficult foreign matter such as dust to enter the air space from outside through the circulation hole. Also, it becomes difficult for light emitted from the light sources to leak to the outside through the circulation hole.

In the illumination device, it is preferable that the first support member be a heat dissipation member.

The illumination device may include a second support member including a flat second attaching part that is fixed onto the bottom plate such that a front end and a rear end thereof are both disposed within the space, and a flat second standing wall that rises from the front end of the second attaching part, the second standing wall having the light source substrate fixed thereto, thereby allowing the light source unit to be disposed within the space, wherein the circulation hole is formed either through the light source substrate, the second standing wall, and the one of the side walls, or the bottom plate.

The illumination device may be configured such that if the circulation hole is formed through the light source substrate, the second standing wall, and the one of the side walls, then a first section that is formed through the light source substrate and the second standing wall, and a second section that is formed through the one of the side walls do not match each other in position when viewed from a direction of penetration. In the illumination device, the first section and the second section do not match each other in position when viewed from the axis direction of the circulation hole, and thus, it becomes difficult for foreign matter such as dust to enter the air space from outside through the circulation hole. Also, it becomes difficult for light emitted from the light sources to leak to the outside through the circulation hole.

In the illumination device, it is preferable that the second support member be a heat dissipation member.

In addition, an illumination device of the present invention includes: a bottom plate; a light guide plate having a front surface from which light inputted from a side edge face of the light guide plate is outputted, and a rear surface facing the bottom plate, the light guide plate being disposed on the bottom plate; a first support member having a flat first attaching part fixed to the bottom plate such that a front end of the first attaching part is interposed between the bottom plate and the light guide plate and such that a rear end of the first support member protrudes from the bottom plate, and a flat first standing wall that stands up from the rear end of the first attaching part; a light source unit having light sources and a light source substrate having a substrate surface upon which the light sources are mounted, the light source unit being attached to the first standing wall such that the substrate surface faces the side edge face of the light guide plate and such that a gap is formed between the substrate surface and the side edge face; and an optical sheet disposed on the front surface of the light guide plate, the optical sheet having an outer edge that protrudes from the side edge face of the light guide plate towards the light source substrate such that the first attaching part disposed on the bottom plate at the gap is covered, wherein a circulation hole is formed through at least one of the light source substrate, the bottom plate, and the first support member such that an air space surrounded by the side edge face of the light guide plate, the substrate surface of the light source substrate, the first attaching part of the first support member, and the outer edge of the optical sheet communicates with an outside of the illumination device. The illumination device includes a circulation hole through at least one of the light source substrate, the bottom plate and the first support member such that the air space and the outside communicate, and thus, the air inside the air space and the outside air can be exchanged, thus mitigating an increase in temperature inside the air space. As a result, thermal expansion in the outer edge of the optical sheet is mitigated, thus mitigating deformations such as wrinkling and warping in the optical sheet.

In the illumination device, it is preferable that the first support member be a heat dissipation member.

A display device of the present invention includes a display panel that displays images using light from the aforementioned illumination device.

In the display device, the display panel may be a liquid crystal panel that uses liquid crystal.

A television receiver according to the present invention includes the display device.

Effects of the Invention

According to the present invention, it is possible to provide an illumination device and the like in which deformations such as wrinkling or warping in the optical sheets are mitigated while mitigating thermal expansion in the outer edge thereof.

DETAILED DESCRIPTION OF EMBODIMENTS

Embodiment 1

Figure 2:
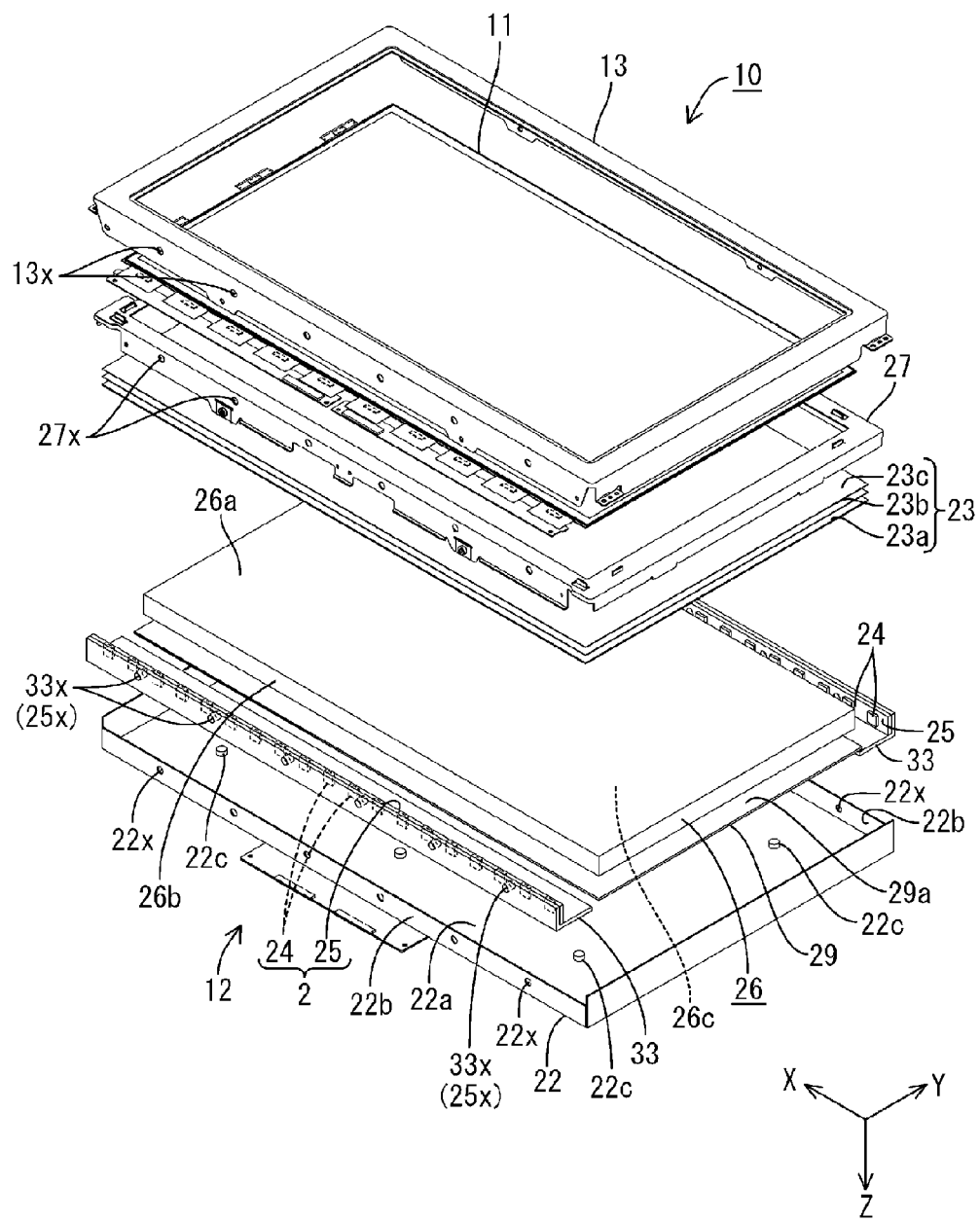
FIG. 2 is an exploded perspective view showing a schematic configuration of a liquid crystal display device.
Figure 3:
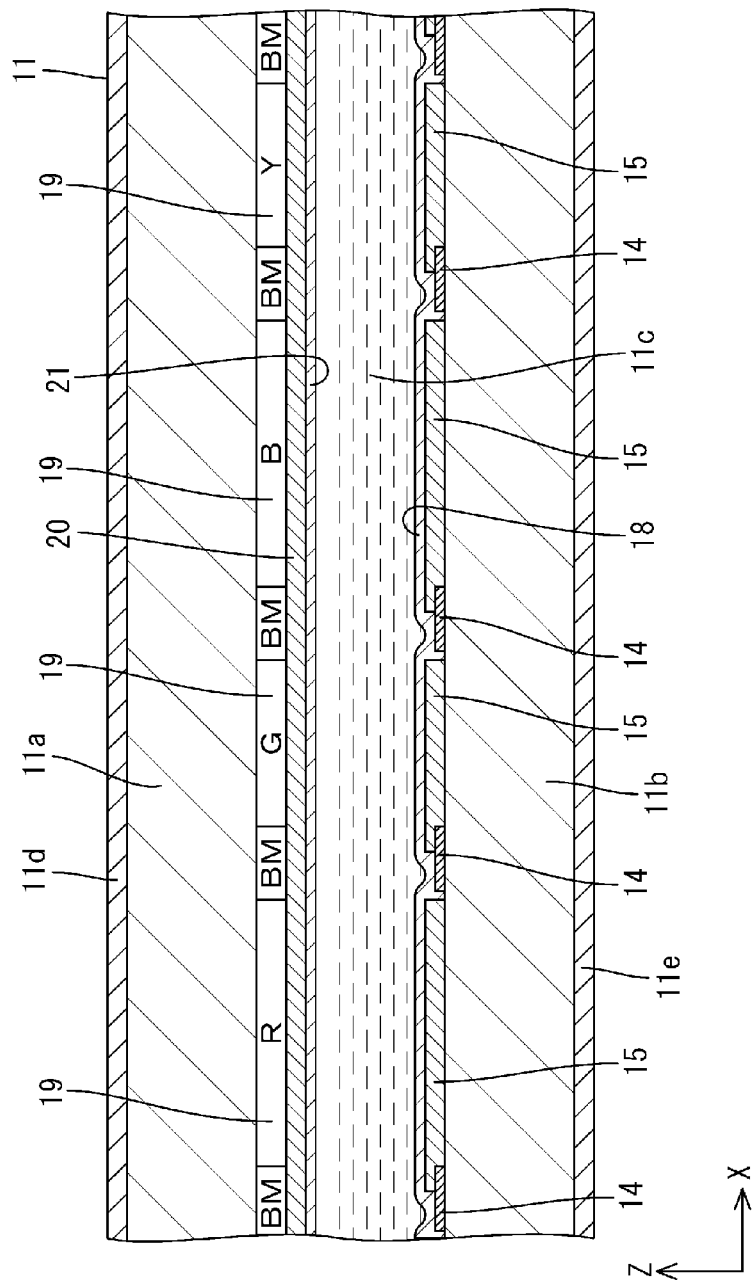
FIG. 3 is a cross-sectional view that shows a cross-sectional configuration of the liquid crystal panel along the longer side direction.

Embodiment 1 of the present invention will be explained below with reference to FIGS. 1 to 7. In the present embodiment, a liquid crystal display device 10 will be described as an example. The drawings indicate an X axis, a Y axis, and a Z axis in a portion of the drawings, and each of the axes indicates the same direction for the respective drawings. The top side of FIGS. 2 and 3 is the front side, and the bottom side of FIGS. 2 and 3 is the rear side.

(Television Receiver)

Figure 1:
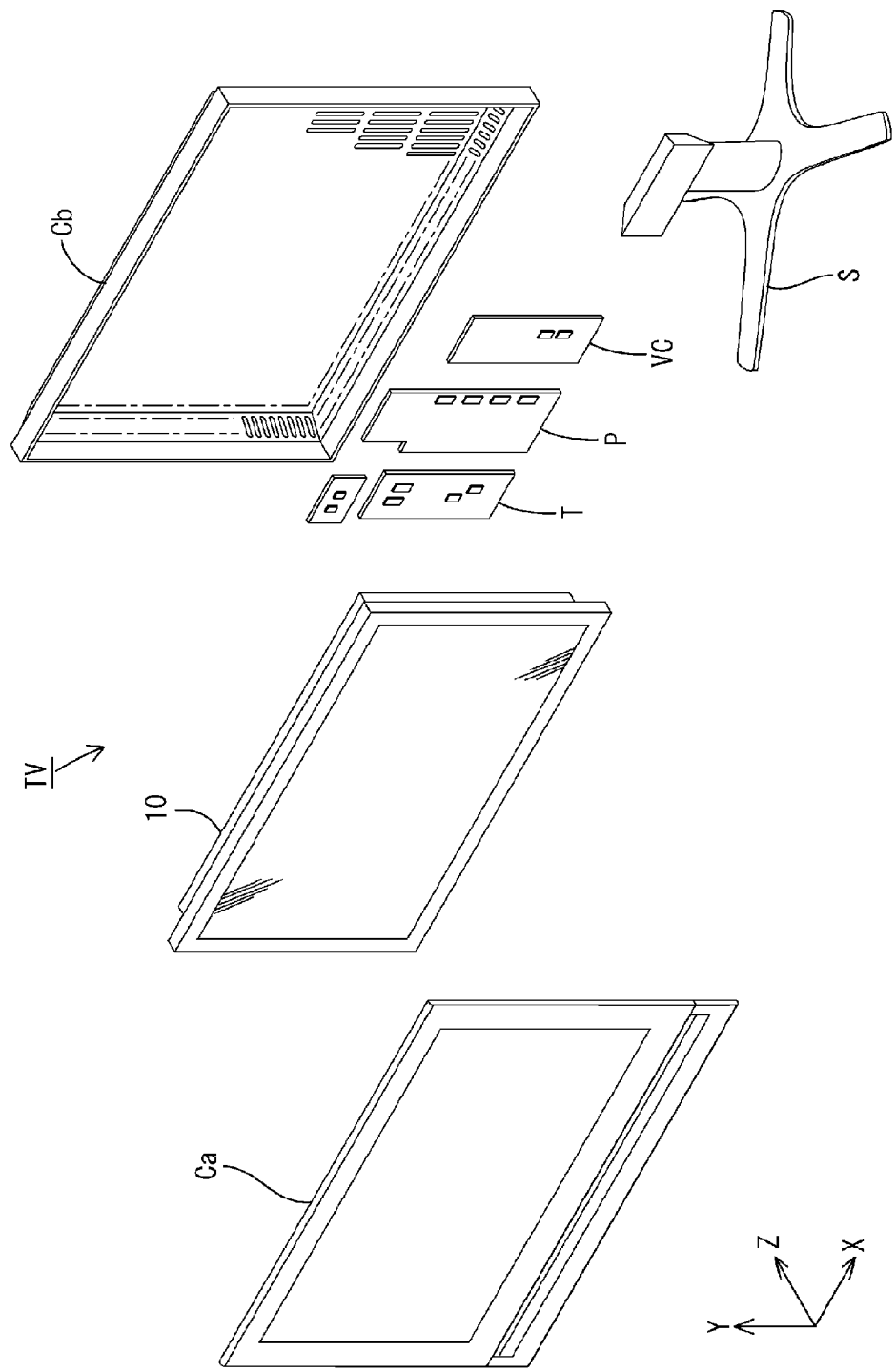
FIG. 1 is an exploded perspective view that shows a schematic configuration of a television receiver according to Embodiment 1 of the present invention.

As shown in FIG. 1, a television receiver TV according to the present embodiment includes a liquid crystal display device (an example of a display device) 10, which is a display device, front and rear cabinets Ca and Cb that house the liquid crystal display device 10 therebetween, a power source circuit substrate P for supplying power, a tuner (receiver) T that can receive a television image signal, an image conversion circuit substrate VC that converts the television image signal outputted from the tuner T into an image signal for the liquid crystal display device 10, and a stand S.

The liquid crystal display device 10 is formed in a horizontally long quadrangular (rectangular) shape as a whole, and is disposed such that the longer side direction thereof matches the horizontal direction (X axis direction) and the shorter side direction thereof matches the vertical direction (Y direction), respectively. As shown in FIG. 2, the liquid crystal display device 10 includes a liquid crystal panel 11 that is a display panel, and a backlight device (an example of an illumination device) 12 that is an external light source, and these are held together as one component by a frame-shaped bezel 13 and the like.

(Liquid Crystal Panel)

A configuration of the liquid crystal panel 11 in the liquid crystal display device 10 will be explained. The liquid crystal panel 11 is formed in a horizontally long quadrangular (rectangular) shape as a whole, and as shown in FIG. 3, includes a pair of transparent (having light transmitting properties) glass substrates 11a and 11b, and a liquid crystal layer 11c including liquid crystal, which is a substance that undergoes changes in optical properties based on an applied electric field, the liquid crystal layer being interposed between the substrates 11a and 11b, and the substrates 11a and 11b are bonded together with a sealing member, which is not shown in drawings, at a gap therebetween equal to the thickness of the liquid crystal layer. On the respective outer surfaces of the two substrates 11a and 11b, polarizing plates 11d and 11e are bonded. The longer side direction of the liquid crystal panel 11 matches the X axis direction, and the shorter side direction thereof matches the Y axis direction.

Figure 4:
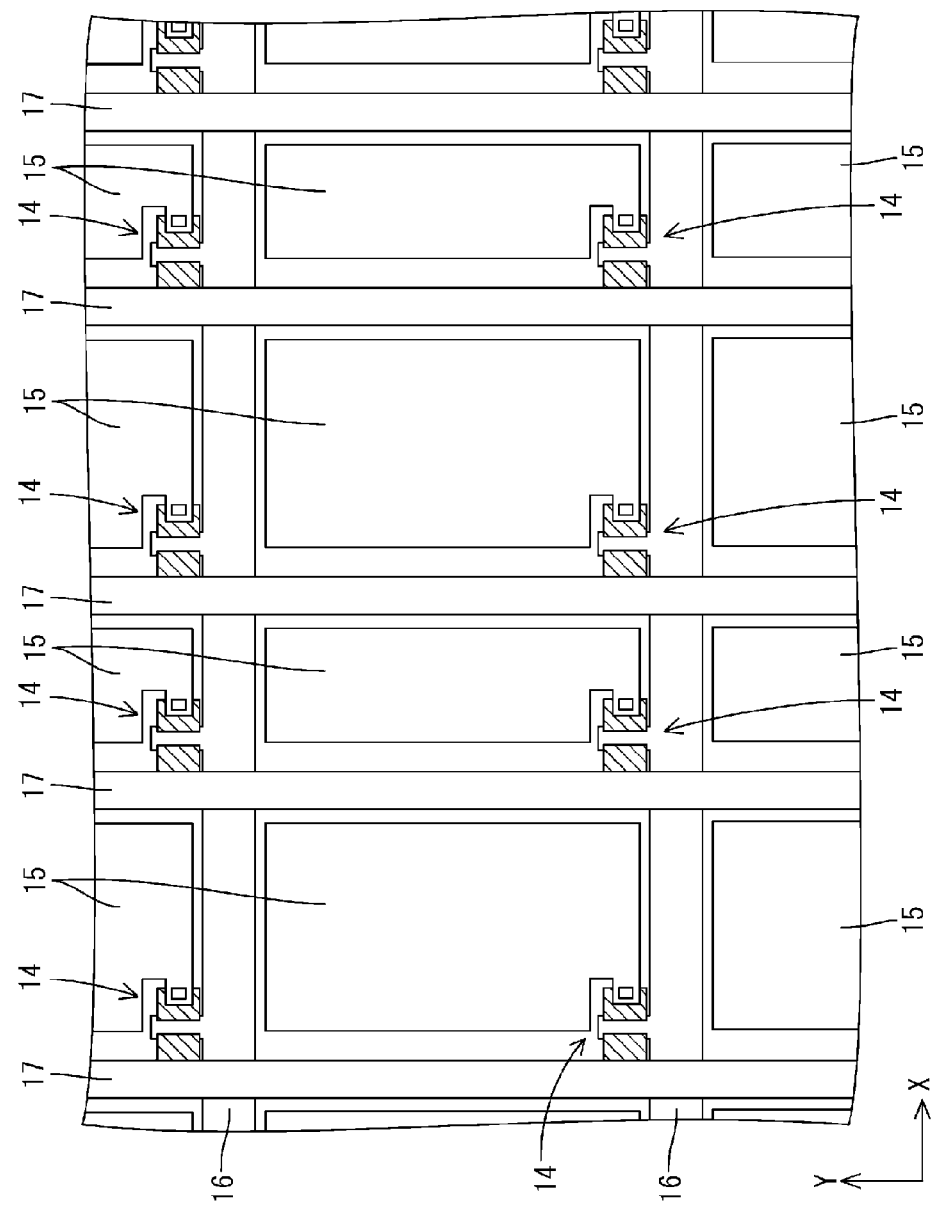
FIG. 4 is a magnified plan view that shows a plan view configuration of an array substrate.

Of the two substrates 11a and 11b, one on the front side (front surface side) is a CF substrate 11a, and the other on the rear side (rear surface side) is an array substrate 11b. As shown in FIG. 4, the inner surface of the array substrate 11b, or in other words, the surface thereof facing the liquid crystal layer 11c (facing the CF substrate 11a) is provided with a plurality of TFTs (thin film transistors) 14, which are switching elements, and pixel electrodes 15 in a matrix (in rows and columns). Around the respective TFTs 14 and pixel electrodes 15 are gate wiring lines 16 and source wiring lines 17 formed in a grid pattern surrounding the TFTs 14 and the pixel electrodes 15. The pixel electrodes 15 have a vertically long quadrangular (rectangular) shape in which the longer side direction thereof matches the Y axis direction and the shorter side direction thereof matches the X axis direction, and the pixel electrodes 15 are made of a transparent electrode such as ITO (indium tin oxide) or ZnO (zinc oxide). The gate wiring lines 16 and the source wiring lines 17 are respectively connected to the gate electrodes and the source electrodes of the TFTs 14, and the pixel electrodes 15 are connected to the drain electrodes of the TFTs 14, respectively. As shown in FIG. 3, an alignment film 18 for defining the orientation of liquid crystal molecules is disposed on the TFTs 14 and the pixel electrodes 15 on the side facing the liquid crystal layer 11c. On an edge of the array substrate 11b, terminal parts led out from the gate wiring lines 16 and the source wiring lines 17 are formed, and on the terminal parts, driver parts for driving the liquid crystal, which are not shown in drawings, are crimp-connected via an anisotropic conductive film (ACF), and the driver parts for driving the liquid crystal are electrically connected to a display control circuit substrate, which is not shown in drawings, via various wiring substrates or the like. The display control circuit substrate is connected to the image conversion circuit substrate VC in the television receiver TV (see FIG. 1), and supplies driving signals to the respective wiring lines 16 and 17 through the driver parts in accordance with output signals from the image conversion circuit substrate VC.

Figure 5:
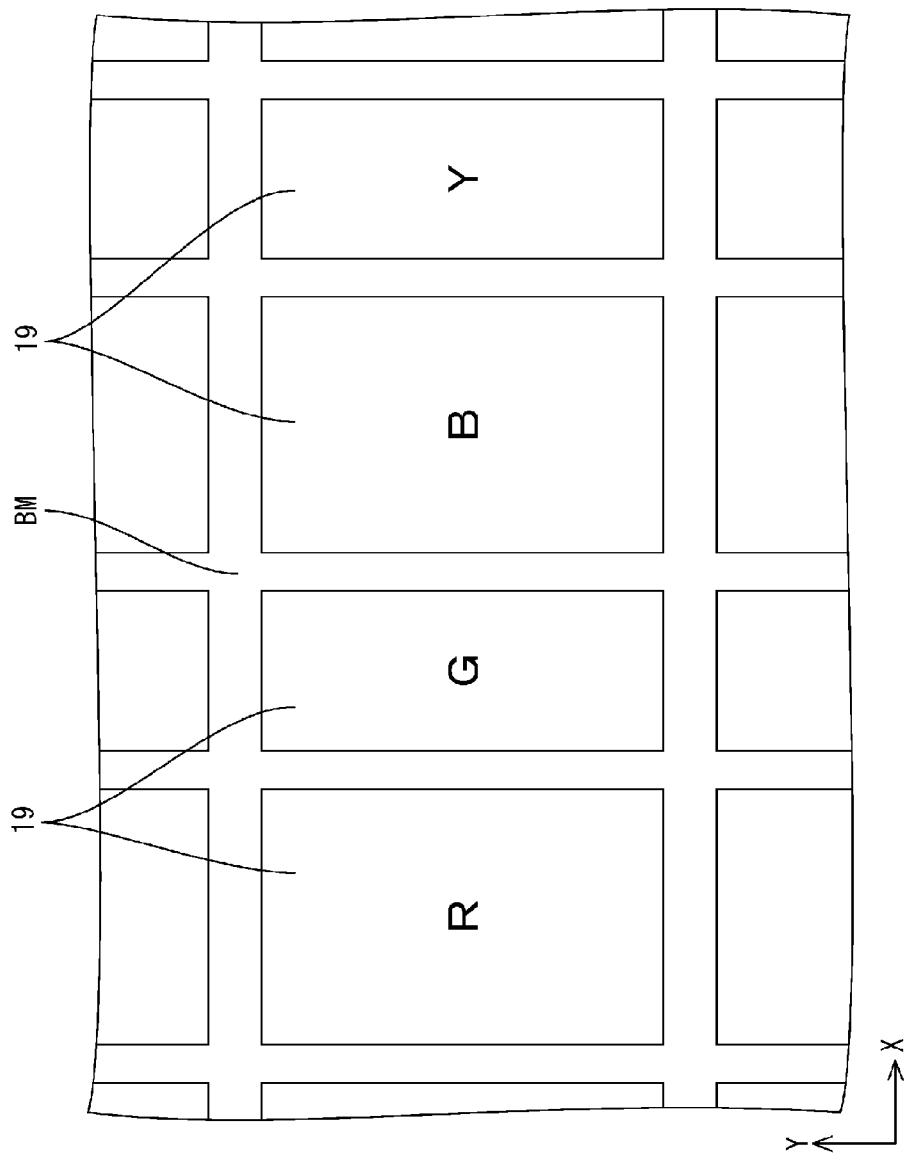
FIG. 5 is a magnified plan view that shows a plan view configuration of a CF substrate.

On the other hand, as shown in FIG. 5, an inner surface of the CF substrate 11a, or in other words, the surface thereof facing the liquid crystal layer 11c (facing the array substrate 11b) is provided with color filters 19 including a plurality of colored portions R, G, B, and Y respectively corresponding to the respective pixels on the array substrate 11b, the colored parts being arranged in a matrix (in rows and columns). The color filters 19 of the present embodiment include yellow colored portions Y in addition to red colored portions R, green colored portions G, and blue colored portions B, which are the three primary colors of light, and the respective colored portions R, G, B, and Y selectively transmit light of the corresponding colors (corresponding wavelengths). Each of the colored portions R, G, B, and Y is formed in a vertically long quadrangular (rectangular) shape with the longer side direction matching the Y axis direction and the shorter side direction matching the X axis direction, respectively, in a manner similar to the pixel electrodes 15. A grid-shaped light-shielding layer (black matrix) BM is disposed between the respective colored portions R, G, B, and Y to prevent the colors from mixing. As shown in FIG. 3, in the CF substrate 11a, an opposite electrode 20 and an alignment film 21 are layered in this order on the surface of the color filters 19 facing the liquid crystal layer 11c.

The arrangement and size of the respective colored portions R, G, B, and Y constituting the color filters 19 will be explained in detail. As shown in FIG. 5, the respective colored portions R, G, B, and Y are arranged in a matrix such that the X axis direction is the row direction and the Y axis direction is the column direction, and while the column direction (Y axis direction) sizes of the respective colored portions R, G, B, and Y are all the same, the row direction (X axis direction) sizes of the respective colored portions R, G, B, and Y are different from each other. Specifically, the respective colored portions R, G, B, and Y are arranged along the row direction in the order of the red colored portion R, the green colored portion G, the blue colored portion B, and the yellow colored portion Y starting from the left hand side of FIG. 5, and the row direction sizes of the red colored portion R and the blue colored portion B are larger than the row direction sizes of the yellow colored portion Y and the green colored portion G. In other words, the colored portions R and B, which have relatively large row direction sizes, and the colored portions G and Y, which have relatively small row direction sizes, are arranged repeatedly in the row direction in an alternating fashion. Accordingly, the area of the red colored portion R and the blue colored portion B is larger than the area of the green colored portion G and the yellow colored portion Y. The area of the blue colored portion B is equal to the area of the red colored portion R. Similarly, the area of the green colored portion G is equal to the area of the yellow colored portion Y. FIGS. 3 and 5 show a case in which the area of the red colored portions R and the blue colored portions B is approximately 1.6 times larger than the area of the yellow colored portions Y and the green colored portions G.

As a result of the color filters 19 having the above-mentioned configuration, in the array substrate 11b, as shown in FIG. 4, the sizes of the pixel electrodes 15 in the row direction (X axis direction) differ from each other among respective columns. In other words, with respect to the row direction, the size and area of pixel electrodes 15 that face the red colored portion R and the blue colored portion B are larger than the size and area of pixel electrodes 15 that face the yellow colored portion Y and the green colored portion G. The gate wiring lines 16 are arranged at an equal pitch, while the source wiring lines 17 are arranged at two different pitches corresponding to the sizes of the pixel electrodes 15 in the row direction.

As described above, the liquid crystal display device 10 according to the present embodiment uses a liquid crystal panel 11 having color filters 19 including four colored portions R, G, B, and Y, and thus, as shown in FIG. 1, the television receiver TV includes a specialized image conversion circuit substrate VC. That is, this image conversion circuit substrate VC can convert the television image signals outputted from the tuner T into image signals of respective colors of blue, green, red, and yellow, and can output the generated image signals of the respective colors to the display control circuit substrate. The display control circuit substrate drives TFTs 14 provided for pixels of respective colors in the liquid crystal panel 11 through the respective wiring lines 16 and 17, based on these image signals, thereby appropriately controlling the transmission of light that passes through the respective colored portions R, G, B, and Y of the respective colors.

(Backlight Device)

Next, a configuration of the backlight device 12 of the liquid crystal display device 10 will be explained. As shown in FIG. 2, the backlight device 12 includes a chassis (housing member) 22 formed in a substantially box shape that has an open portion that is open towards the light emitting side (towards the liquid crystal panel 11), and optical sheets 23 disposed covering the open portion of the chassis 22. Provided within the chassis 22 are LEDs 24, which are light sources, LED substrates (light source substrates) 25 upon which the LEDs 24 are mounted, heat dissipation members (first support members) 33 that support the LED substrates 25, a light guide plate 26 that guides light from the LEDs 24 to the optical sheets 23 (liquid crystal panel 11), and a frame 27 that presses the light guide plate 26 from the front. Light source units 2 include the LEDs 24 and the LED substrates 25. The backlight device 12 is of a so-called edge light type (side light type) in which LEDs 24 mounted on the LED substrates 25 are disposed at respective two edges of the light guide plate 26. The edge light type backlight device 12 is attached integrally to the liquid crystal panel 11 by the frame-shaped bezel 13, thus forming the liquid crystal display device 10.

(Chassis)

Figure 6:
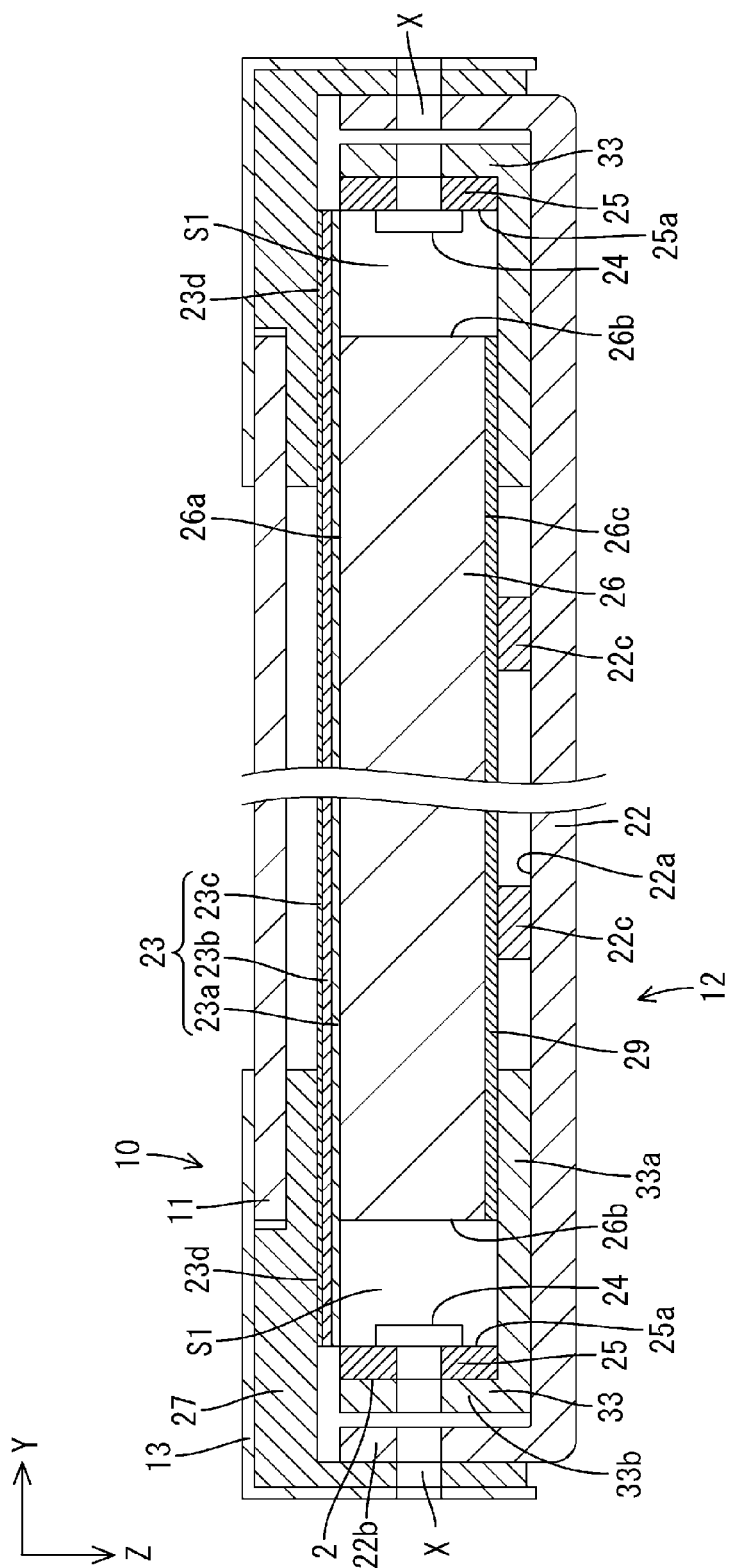
FIG. 6 is a cross-sectional view that shows a cross-sectional configuration of the liquid crystal display device along the shorter side direction.

The chassis (housing member) 22 is made of metal, and as shown in FIGS. 2 and 6, has a shallow substantially box shape as a whole with the front side thereof open, the chassis 22 being constituted of a bottom plate 22a having a horizontally long quadrangular shape similar to that of the liquid crystal panel 11, and side walls 22b that rise up from the respective outer edge sides of the bottom plate 22a. In the chassis 22 (bottom plate 22a), the longer side direction thereof matches the X axis direction (horizontal direction), and the shorter side direction thereof matches the Y axis direction (vertical direction). The frame 27 and the bezel 13 can be fixed onto the side walls 22b with screws. A plurality of protrusions 22c are provided on the bottom plate 22a. The protrusions 22c support the light guide plate 26 from the rear thereof in the chassis 22, and mitigate warping and the like in the light guide plate 26.

(Optical Sheets)

As shown in FIG. 2, the optical sheets 23 are thin sheets that have a horizontally long rectangular shape in a plan view, as in the liquid crystal panel 11 and the chassis 22. The optical sheets 23 are disposed on the front side (light-emitting side) of the light guide plate 26, thereby being interposed between the light guide plate 26 and the liquid crystal panel 11. The optical sheets 23 include a diffusion sheet 23a, a lens sheet 23b, and a reflective polarizing plate 23c layered in this order from the light guide plate 26.

The optical sheets 23 are longer than the light guide plate 26 in the shorter side direction (Y axis direction). As will be described later, the optical sheets 23 have a size such that the outer edges 23d thereof protrude further out than the side edge faces 26b of the light guide plate 26.

(Frame)

As shown in FIG. 2, the frame 27 is formed in a frame shape that extends along the outer edges of the light guide plate 26, and can press almost the entire outer edge of the light guide plate 26 from the front side. The frame 27 is made of a synthetic resin, and by having the surface thereof colored black, for example, the frame 27 has light-shielding properties. The frame 27 can receive the outer edges of the liquid crystal panel 11 from the rear thereof.

(LED)

As shown in FIG. 6, the LEDs 24 are mounted on the LED substrate 25, and are so-called top type LEDs in which light-emitting surfaces are on the side opposite to the mounting surface that is mounted on the LED substrate 25. On the light-emitting surface of each LED 24, a lens member (not shown in drawings) for outputting light while diffusing the light in a wide angle is provided. The lens member is interposed between the LED 24 and the light-receiving surface 26b of the light guide plate 26 and is convex towards the light guide plate 26 so as to have a spherical shape on the light-emitting surface thereof. The light-emitting surface of the lens member is curved along the lengthwise direction of the light-receiving surface 26b of the light guide plate 26 such that the cross-sectional shape thereof is substantially an arc.

Each LED 24 includes an LED chip (not shown in drawings) that is a light-emitting source that emits blue light, and a green phosphor and a red phosphor as phosphors that emit light by being excited by the blue light. Specifically, each LED 24 has a configuration in which an LED chip made of an InGaN type material, for example, is sealed by a resin material onto a base plate that is attached to the LED substrate 25. The LED chip mounted on the base plate has a primary luminescence wavelength in a range of 420 nm to 500 nm, i.e., the blue wavelength region, and can emit highly pure blue light (single color blue light). The specific primary luminescence wavelength of the LED chip is preferably 451 nm, for example. On the other hand, the resin material that seals the LED chip has the green phosphor that emits green light by being excited by blue light emitted from the LED chip, and the red phosphor that emits red light by being excited by the blue light emitted from the LED chip, the green phosphor and the red phosphor being dispersed in the resin material at a prescribed ratio. By the blue light (light having a blue component) emitted from the LED chip, the green light (light having a green component) emitted from the green phosphor, and the red light (light having a red component) emitted from the red phosphor, the LED 24 can emit light of a prescribed color as a whole such as white light or white light with a bluish tone, for example. Because yellow light can be obtained by mixing the light from the green phosphor having a green component and the light from the red phosphor having a red component, it can also be said that this LED 24 has both the blue component light from the LED chip and yellow component light. The chromaticity of the LED 24 changes based on the absolute value or the relative value of the quantity of green phosphor and red phosphor included, for example, and thus, it is possible to adjust the chromaticity of the LED 24 by appropriately adjusting the amount of green phosphor and red phosphor included. In the present embodiment, the green phosphor has a primary luminescence peak in the green wavelength region from 500 nm to 570 nm inclusive, and the red phosphor has a primary luminescence peak in the red wavelength region from 600 nm to 780 nm inclusive.

Next, the green phosphor and the red phosphor included in the LED 24 will be explained in detail. It is preferable that β-SiAlON, which is a type of SiAlON phosphor, be used as the green phosphor. The SiAlON type phosphor is a substance obtained by replacing some of the silicon atoms of silicon nitride with aluminum atoms, and by replacing some of the nitrogen atoms thereof with oxygen atoms; in other words, the SiAlON is a nitride. The SiAlON phosphor that is a nitride has superior light-emitting efficiency and durability to those of other phosphors made of a sulfide or an oxide, for example. Here, "having superior durability" specifically means that the brightness is less likely to deteriorate over time even after being exposed to high-energy exciting light from the LED chip. In the SiAlON phosphor, a rare earth element (such as Tb, Yg, or Ag) is used as an activator. β-SiAlON, which is a type of SiAlON phosphor, is a substance represented by a general formula $Si_{6-z}Al_zO_zN$:Eu (z representing solid solubility) or $(Si, Al)_6(O, N)_6$:Eu in which aluminum and oxygen are dissolved in a solid solution in β-type silicon nitride crystals. In the β-SiAlON of the present embodiment, Eu (europium) is used as the activator, for example, and because the use of Eu contributes to high purity in the color of the green light that is a fluorescent light, it is very useful for adjusting the chromaticity of the LED 24. On the other hand, it is preferable to use CASN, which is a type of CASN type phosphor, as the red phosphor. The CASN type phosphor is a nitride that includes calcium atoms (Ca), aluminum atoms (Al), silicon atoms (Si), and nitrogen atoms (N), and has superior light-emitting efficiency and durability compared to other phosphors made of sulfide or oxide, for example. In the CASN type phosphor, a rare earth element (such as Tb, Yg, or Ag) is used as an activator. CASN, which is a type of the CASN type phosphor, includes Eu (europium) as an activator, and is represented by a composition formula of $CaAlSiN_3$:Eu.

(LED Substrate)

As shown in FIG. 2, the LED substrates 25 are formed in a long plate shape extending along the longer side direction (X axis direction; lengthwise direction of the light-receiving surface 26b of the light guide plate 26) of the chassis 22, and the main surface thereof is parallel to the X axis direction and the Z axis direction. In other words, the LED substrates 25 are housed in the chassis 22 so as to be perpendicular to the plate surfaces of the liquid crystal panel 11 and the light guide plate 26 (optical sheets 23). The LED substrates 25 are in a pair disposed on both long side edges in the chassis 22. Light source surfaces (surfaces facing the light guide plate 26) 25a of the LED substrates 25, which are main surfaces on the inner side, or in other words, the side facing the light guide plate 26, have LEDs 24 of the above-mentioned configuration mounted thereon. A plurality of LEDs 24 are arranged in a row (in a line) along the length direction (X axis direction) of the light source surfaces 25a of the LED substrates 25. Therefore, a plurality of LEDs 24 are provided along the longer side direction on the respective longer edges of the backlight device 12. The pair of LED substrates 25 are housed in the chassis 22 such that the light source surfaces (mounting surfaces for the LEDs 24) 25a thereof face each other, and thus, the light-emitting surfaces of the respective LEDs 24 mounted on the LED substrates 25 face each other, and the light axes of the respective LEDs 24 match closely with the Y axis direction.

The base material for the LED substrates 25 is a metal such as an aluminum-type material as in the chassis 22, and the surfaces thereof have formed thereon wiring patterns (not shown in drawings) made of a metal film such as copper foil through an insulating layer, and on the outermost surface, a reflective layer (not shown in drawings) being colored a highly reflective white is formed. As a result of the wiring pattern, the respective LEDs 24 arranged in a row on the respective LED substrates 25 are connected to each other in series. It is also possible to use an insulating material such as a ceramic as the base material for the LED substrates 25. As will be described below, the LED substrates 25 include holes 25*x* constituting circulation holes X.

(Heat Dissipation Member)

Figure 7:
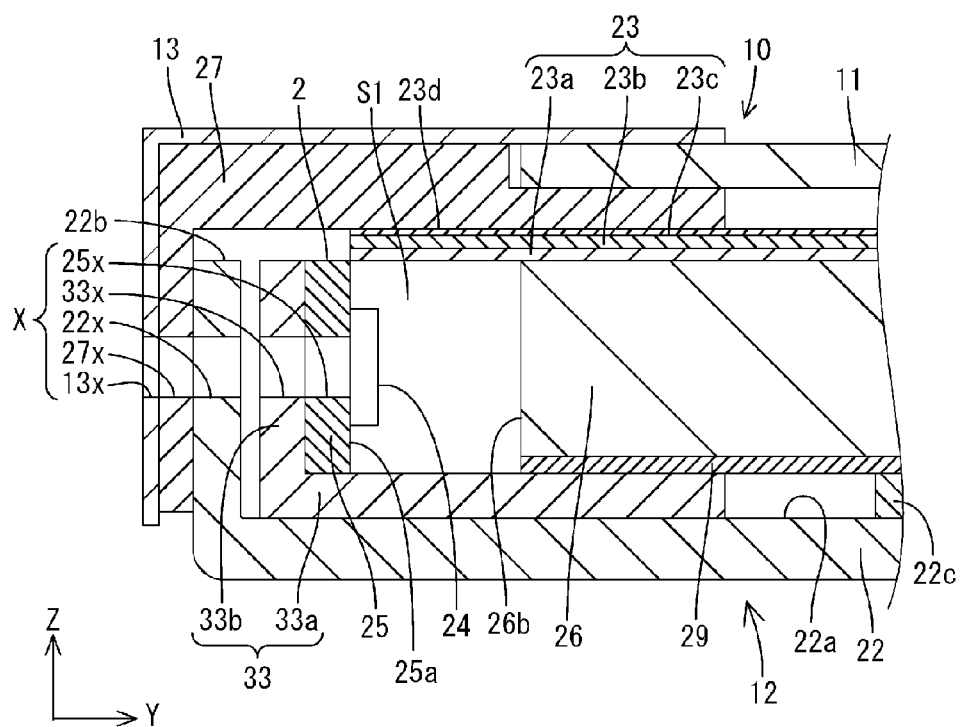
FIG. 7 is a magnified cross-sectional view of the liquid crystal display device shown in FIG. 6.

Heat dissipation members (first support members) 33 are made of a metal such as aluminum having excellent heat dissipation properties, and as shown in FIG. 6, have a substantially L shaped outer shape in a cross-sectional view. As shown in FIG. 7, the heat dissipation members 33 are each constituted of a flat first attaching part 33*a* fixed on the bottom plate 22*a*, and a flat first standing wall 33*b* that rises up from the rear end of the first attaching part 33*a*. The first attaching part 33*a* has the front end interposed between the bottom plate 22*a* of the chassis 22 and the light guide plate 26, and the rear end in the gap between the side wall 22*b* and the side edge face (light-receiving face) 26*b* of the light guide plate 26. The LED substrates 25 are attached to the first standing walls 33*b*. The substrate surface 25*a* of the LED substrate 25 faces the side edge face 26*b* of the light guide plate 26. The LED substrate 25 may be fixed to the first standing wall 33*b* of the heat dissipation member 33 through a sheet-shaped adhesive member, or fixed using a fixing member such as a screw.

(Light Guide Plate)

The light guide plate 26 is made of a synthetic resin (an acrylic resin such as PMMA or a polycarbonate, for example) with a higher refractive index than air and almost completely transparent (excellent light transmission). As shown in FIG. 2, the light guide plate 26 is a horizontally long quadrangle in a plan view, as in the liquid crystal panel 11 and the chassis 22, and the longer side direction thereof matches with the X axis direction and the shorter side direction matches with the Y axis direction. As shown in FIG. 6, the light guide plate 26 is disposed in the chassis 22 directly below the liquid crystal panel 11 and the optical sheets 23, and between the pair of LED substrates 25, which face each other in the Y axis direction, disposed on both longer sides of the chassis 22. Thus, the LEDs 24 (LED substrates 25) and the light guide plate 26 are aligned in the Y axis direction, whereas the optical sheets 23 (liquid crystal panel 11) and the light guide plate 26 are aligned in the Z axis direction, and the two directions are perpendicular to each other. The light guide plate 26 has the function of receiving light emitted in the Y axis direction from the LEDs 24, and causing the light to be propagated therein and to be outputted towards the optical sheets 23 (Z axis direction). The outer edges of the light guide plate 26 are pressed by the frame 27 through the optical sheets 23 (refer to FIGS. 6 and 7).

As shown in FIGS. 2 and 6, the light guide plate 26 has a substantially flat plate shape that extends along the respective plate surfaces of the bottom plate 22*a* of the chassis 22 and the optical sheets 23, and the main surfaces of the light guide plate 26 are parallel to the X axis direction and the Y axis direction. Of the main surfaces of the light guide plate 26, the surface on the front is a light-output surface (front surface) 26*a* that outputs light therein towards the optical sheets 23 and the liquid crystal panel 11. Of the outer edge faces adjacent to the main surface of the light guide plate 26, the edge faces on the longer sides along the X axis direction face the respective LEDs 24 (LED substrates 25) with a prescribed gap therebetween, and these are light-receiving surfaces 26*b* that receive light emitted from the LEDs 24. The light-receiving surfaces 26*b* are on a plane parallel to that defined by the X axis and the Z axis, and are substantially perpendicular to the light output surface 26*a*. The LEDs 24 and the light-receiving surfaces 26*b* are aligned in the Y axis direction, which is parallel to the light-output surface 26*a*. On an opposite surface (rear surface) 26*c* of the light guide plate 26 opposite to the light-output surface 26*a*, a reflective sheet 29 that can reflect light in the light guide plate 26 towards the front is provided so as to cover the entire opposite surface 26*c*. At least one of the light-output surface 26*a* and the opposite surface 26*c* opposite thereto of the light guide plate 26 is patterned such that a reflective part (not shown in drawings) that reflects light in the light guide plate 26 or a diffusion part (not shown in drawings) that diffuses light in the light guide plate 26 has a prescribed planar distribution, and thus, light outputted from the light-output surface 26*a* is controlled so as to have an even planar distribution within the plane.

(Reflective Sheet)

The reflective sheet 29 is made of a white foam plastic sheet (foam polyethylene terephthalate sheet, for example). The reflective sheet 29 has a horizontally long quadrangular shape in a plan view, and the longer side direction thereof matches the X axis direction and the shorter side direction thereof matches the Y axis direction. The reflective sheet 29 is housed in the chassis 22 so as to cover the bottom plate 22*a*.

(Purposes of Having Four Primary Colors in Liquid Crystal Panel and Differentiating Areas of Respective Colored Portions of Color Filters)

As already described, as shown in FIGS. 3 and 5, the color filters 19 in the liquid crystal panel 11 of the present embodiment have yellow colored portions Y in addition to the colored portions R, G, and B, which have the three primary colors of light. Thus, the color gamut for images displayed using transmitted light is increased, allowing display to be performed with excellent color reproduction. In addition, because the light that is transmitted through the yellow colored portions Y has a wavelength close to the luminosity peak, it tends to be perceived by human eyes as bright light even with a small amount of energy. As a result, even if the power output of the LEDs 24 in the backlight device 12 is reduced, the sufficient brightness can be obtained, thereby achieving effects such as a reduction in power consumption of the LEDs 24 and thus excellent environmental performance.

On the other hand, when using the liquid crystal panel 11 having four primary colors as described above, the display image on the liquid crystal panel 11 tends to have a yellowish tone as a whole. In order to avoid this, in the backlight device 12 of the present embodiment, the chromaticity of the LEDs 24 is adjusted to have a bluish tone, blue being a complementary color of yellow, such that the chromaticity of the display image is corrected. For this reason, the LEDs 24 provided in the backlight device 12 have the primary luminescence wavelength in the blue wavelength region as mentioned above, and emit light in the blue wavelength region at the highest intensity.

Through research, the inventor of the present invention has found that when adjusting the chromaticity of the LEDs 24 as described above, the more the chromaticity is adjusted from white to blue, the lower the brightness of the emitted light is. In the present embodiment, of the color filters 19, the blue colored portions B are larger in area than the green colored portions G and the yellow colored portions Y, and thus, the light transmitted through the color filters 19 can include more blue light, which is complementary to yellow. This way, when adjusting the chromaticity of the LEDs 24 to correct the chromaticity of the display image, it is not necessary to adjust the chromaticity of the LEDs 24 toward the blue color as much as before, and as a result, it is possible to prevent the brightness of the LEDs 24 from decreasing due to the chromaticity adjustment.

Furthermore, according to the research conducted by the inventor of the present invention, when using the liquid crystal panel 11 having four primary colors, the brightness of the red color in particular is lowered among the light emitted from the liquid crystal panel 11. The possible cause thereof is that, in the liquid crystal panel 11 having four primary colors, the number of subpixels constituting one pixel is increased from three to four, thus reducing the area of each subpixel compared to a liquid crystal panel having three primary colors, and as a result, the brightness of the red color light in particular is lowered. Thus, in the present embodiment, of the color filters 19, the red colored portions R are given a larger area than the green colored portions G and the yellow colored portions Y. Thus, it is possible to increase the amount of red in the light transmitted through the color filters 19, thereby mitigating a decrease in brightness of red light resulting from increasing the number of colors of the color filters 19 to four.

(Description of Configuration of Main Part of the Present Embodiment)

The main part of the liquid crystal display device 10 of the present embodiment will be described in detail with reference to FIGS. 6 and 7. As shown in FIGS. 6 and 7, in the backlight device 12 included in the liquid crystal display device 10, the outer edges 23d of the optical sheets 23 protrude out towards the LED substrates 25 from the side edge faces 26b of the light guide plate 26. The tips of the outer edges 23d reach the positions of the LED substrates 25, and thus, the outer edges 23d are placed over the front surface 26a of the light guide plate 26 so as to cover the portions of the bottom plate 22a (first attaching part 33a) between the substrate surfaces 25a of the LED substrates 25 and the side edge faces 26b of the light guide plate 26. In other words, the outer edges 23d of the optical sheet are disposed so as to cover from above the groove-shaped gaps surrounded by the substrate surfaces 25a of the LED substrates 25, the side edge faces 26b of the light guide plate 26, and the bottom plate 22a (first attaching part 33a) therebetween.

As shown in FIGS. 6 and 7, there is an air space S1 surrounded by the substrate surface 25a of the LED substrate 25, the side edge face 26b of the light guide plate 26, the bottom plate 22a (first attaching part 33a) therebetween, and the outer edges 23d of the optical sheets 23. There are two such air spaces S1 along the longer side direction of the light guide plate 26.

A hole 25x and a hole 33x are provided respectively through the LED substrate 25 and the first standing wall 33b of the heat dissipation member 33 supporting the LED substrate 25 in the chassis 22. The side wall 22b of the chassis 22, the portion of the frame 27 that covers the side wall 22b from the outside, and the bezel 13 that covers the frame 27 from the outside are respectively provided with a hole 22x, a hole 27x, and a hole 13x therethrough. The hole 25x, the hole 33x, the hole 22x, the hole 27x, and the hole 13x provided therethrough are aligned in one row when viewing the liquid crystal display device 10 from the side (from the side wall 22b of the chassis 22). The hole 25x, the hole 33x, the hole 22x, the hole 27x, and the hole 13x are circular, and the sizes thereof are set to be approximately the same.

The hole 25x, the hole 33x, the hole 22x, the hole 27x, and the hole 13x are used in order to connect the air on the outside of the backlight device 12 (outside air) with air in the air space S1. The hole 25x, the hole 33x, the hole 22x, the hole 27x, and the hole 13x constitute one circulation hole X. The backlight device 12 of the present embodiment is provided with a plurality of such circulation holes X (refer to FIG. 2).

When the liquid crystal display device 10 is powered on, power is supplied to the backlight device 12, and the respective LEDs 24 on the LED substrates 25 are illuminated. Then, the light therefrom enters the light guide plate 26 from the side edge faces 26b, and travels inside the light guide plate 26 by being reflected off of the reflective sheet 29 or the like disposed on the rear of the light guide plate 26, and this light, which has become planar, is outputted from the front surface 26a. The light outputted from the front surface 26a passes through the optical sheets 23 and illuminates the liquid crystal panel 11 from the rear. The liquid crystal panel 11 relies on this light to display images on the surface thereof.

(Effects)

As the respective LEDs 24 are illuminated as described above, the LEDs 24, the LED substrates 25, and the like are heated up, which causes the temperature in the backlight device 12 to rise. In particular, there is a risk that air inside the air spaces S1 described above becomes heated to a high temperature. However, the backlight device 12 of the present embodiment is provided with circulation holes X as described above. As a result, the air inside the air space S1 and the air outside of the backlight device 12 (outside air) can enter or exit the backlight device 12 through the circulation holes X. As a result, air heated inside the air spaces S1 (heated air) can be expelled from the backlight device 12 using the circulation holes X, and the outside air can be pulled into the air spaces S1. Thus, it is possible to mitigate an increase in temperature inside the air spaces S1. As a temperature increase in the air spaces S1 is mitigated, thermal expansion of the outer edges 23d of the optical sheets 23 disposed above the air space S1 is also mitigated. As thermal expansion in the outer edges 23d of the optical sheets 23 is mitigated in this manner, deformations such as wrinkling or warping in the optical sheets 23, which occur due to thermal expansion of the outer edges 23d, are also mitigated. If deformations such as wrinkling or warping in the optical sheets 23 are mitigated, light unevenness (uneven brightness) resulting from such deformations can be mitigated in the backlight device 12, and thus, display unevenness in the liquid crystal display device 10 is also mitigated.

In the present embodiment, holes 13x and 27x, which are portions of the circulation hole X, are formed in the respective bezel 13 and frame 27, but in other embodiments, holes do not need to be provided in the bezel 13 or the frame 27. If the portions of the bezel 13 and the frame 27 covering the side walls 22b of the chassis 22 are small, for example, then if circulation holes X are formed in the exposed portions of the side walls 22b, there is no need to provide holes in the bezel 13 and the frame 27.

Embodiment 2

Figure 8:
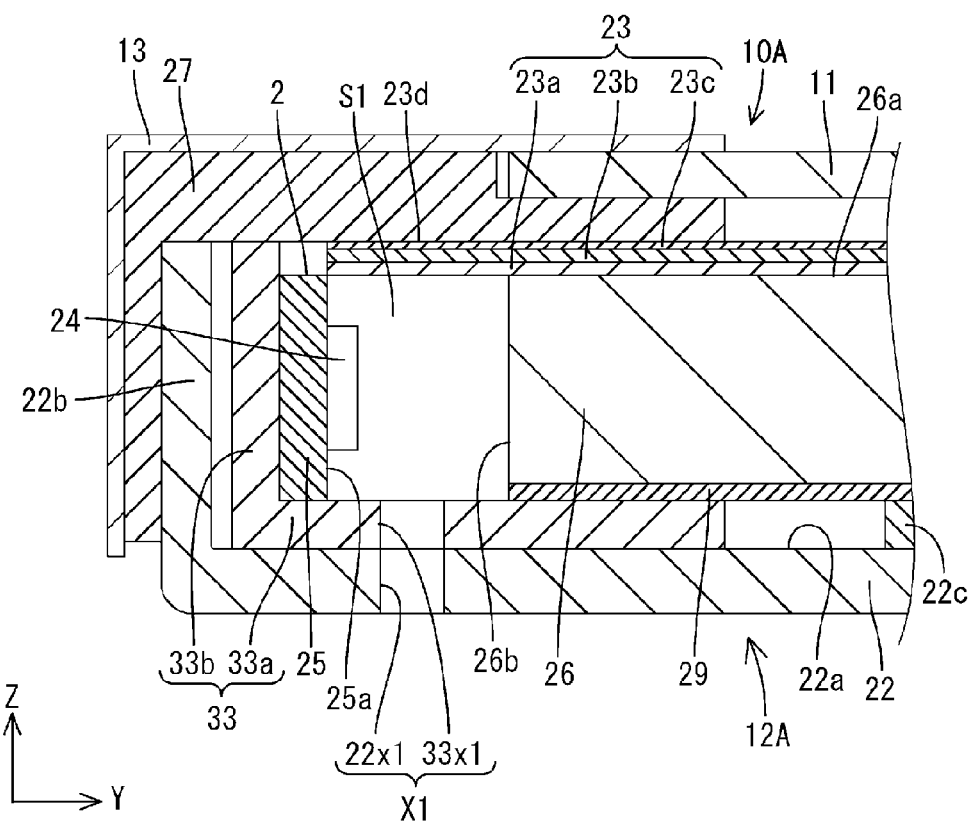
FIG. 8 is a partial cross-sectional view showing a cross-sectional configuration of a liquid crystal display device of Embodiment 2 along the shorter side direction.

Next, with reference to FIG. 8, Embodiment 2 will be explained. The basic configuration of a liquid crystal display device 10A of Embodiment 2 shown in FIG. 8 is similar to that of Embodiment 1. However, the configuration of circulation holes X1 in Embodiment 2 is different from that of Embodiment 1. The circulation holes X1 will be mainly described here.

The liquid crystal display device 10A of the present embodiment includes a backlight device 12A. A first attaching part 33a of a heat dissipation member (first support member) 33 and a bottom plate 22a of a chassis 22, which are included in the backlight device 12A, respectively have a hole 33x1 and a hole 22x1 therethrough. The hole 33x1 and the hole 22x1 constitute a circulation hole X1 through which air in an air space S1 and air outside of the backlight device 12A (outer air) are connected. The hole 33x1 and the hole 22x1 are the same size. A plurality of such circulation holes X1 are provided in the backlight device 12A, and with the circulation holes X1, a rise in temperature inside the air spaces S1 is mitigated. As in Embodiment 1, in the backlight device 12A of the present embodiment, thermal expansion of the outer edges 23d of the optical sheets 23 is mitigated, thus mitigating deformations such as wrinkling and warping in the optical sheets 23. In the present embodiment, the side walls 22b of the chassis 22 are at a height (Z axis direction) such that the tips of the side walls reach the rear surface of the frame 27. The standing wall 33b of the heat dissipation member 33 is also set to be at a height (Z axis direction) such that the tip of the standing wall 33b reaches the rear surface of the frame 27. Thus, if the optical sheets 23 undergo thermal expansion and spread outward (Y axis direction), then the outer edges 23d would be in contact with the standing wall 33b of the heat dissipation member 33. However, as stated above, in the backlight device 12A of the present embodiment, thermal expansion of the outer edges 23d of the optical sheets 23 is mitigated, and thus, contact between the outer edges 23d of the optical sheets 23 and the standing wall 33b of the heat dissipation member 33 is prevented.

Embodiment 3

Figure 9:
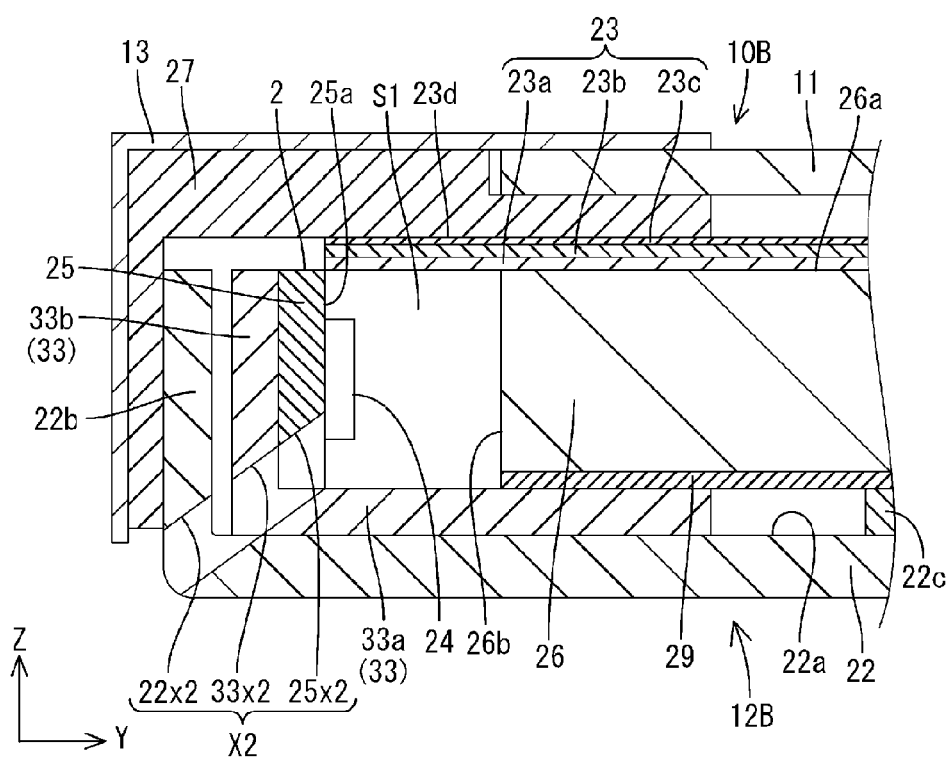
FIG. 9 is a partial cross-sectional view showing a cross-sectional configuration of a liquid crystal display device of Embodiment 3 along the shorter side direction.

Next, with reference to FIG. 9, Embodiment 3 will be explained. The basic configuration of a liquid crystal display device 10B of Embodiment 3 shown in FIG. 9 is similar to that of Embodiment 1. However, the configuration of circulation holes X2 in Embodiment 3 is different from that of Embodiment 1. The circulation holes X2 will be mainly described here.

The liquid crystal display device 10B of the present embodiment includes a backlight device 12B. In the LED substrate 25, the heat dissipation member (first support member) 33, and the chassis 22 included in the backlight device 12B, a hole 25x2, a hole 33x2, and a hole 22x2 are respectively provided therethrough. The circulation hole X2 is constituted of the hole 25x2, the hole 33x2, and the hole 22x2. The circulation hole X2 is provided diagonally through the bottom plate 22a or a side wall 22b of the chassis 22. In other words, the circulation hole X2 is provided from the air space S1 in the backlight device 12B to a corner where the bottom plate 22a and the side wall 22b of the chassis 22 meet. The hole 33x2 of the heat dissipation member 33 provided so as to penetrate a corner where the first attaching part 33a and the first standing wall 33b meet, and the hole 22x2 of the chassis 22 is provided so as to penetrate a corner where the bottom plate 22a and the side wall 22b meet.

A plurality of such circulation holes X2 are provided in the backlight device 12B, and with the circulation holes X2, a rise in temperature inside the air spaces S1 is mitigated. As in Embodiment 1, in the backlight device 12B of the present embodiment, thermal expansion of the outer edges 23d of the optical sheets 23 is mitigated, thus mitigating deformations such as wrinkling and warping in the optical sheets 23.

Embodiment 4

Figure 10:
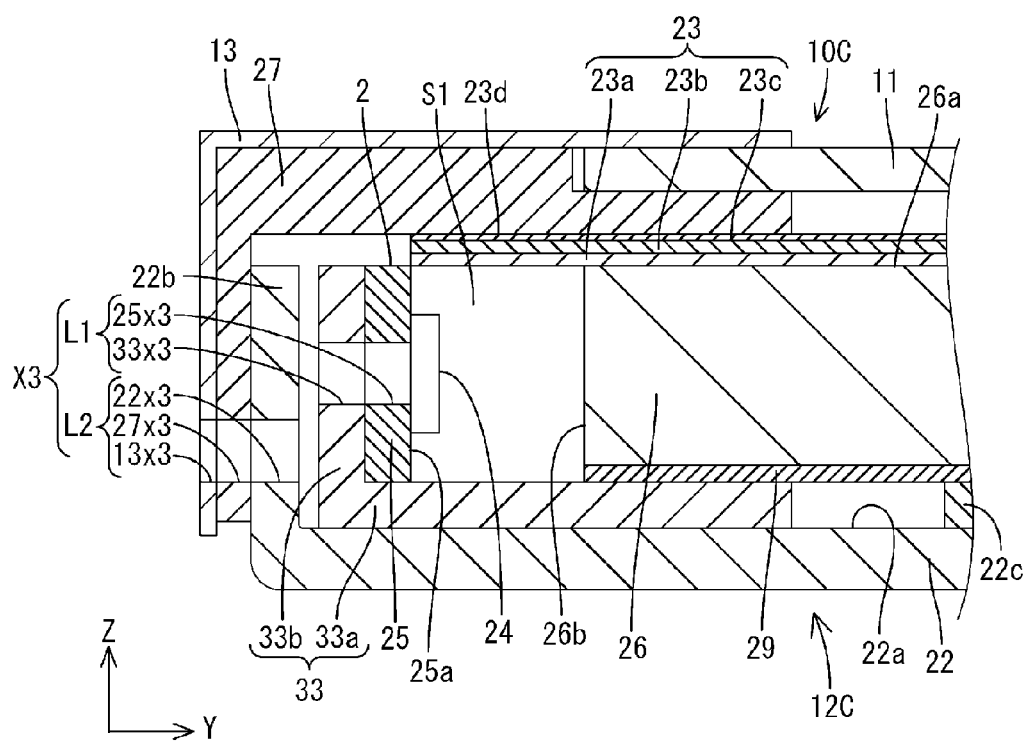
FIG. 10 is a partial cross-sectional view showing a cross-sectional configuration of a liquid crystal display device of Embodiment 4 along the shorter side direction.

Next, with reference to FIG. 10, Embodiment 4 will be explained. The basic configuration of a liquid crystal display device 10C of Embodiment 4 shown in FIG. 10 is similar to that of Embodiment 1. However, the configuration of circulation holes X3 in Embodiment 4 is different from those of Embodiment 1. The circulation holes X3 will be mainly described here.

The liquid crystal display device 10C of the present embodiment includes a backlight device 12C. In the LED substrate 25 and the heat dissipation member (first support member) 33 included in the backlight device 12C, a hole 25x3 and a hole 33x3 are respectively provided therethrough. These holes 25x3 and 33x3 are the same size, and when viewing the configuration from the side wall 22b (Y axis direction; direction of penetration of the respective holes) of the chassis 22, the holes are aligned in a row. In the present embodiment, these holes 25x3 and 33x3 constitute a first section L1. On the other hand, in the side wall 22b of the chassis 22, the frame 27, and the bezel 13, a hole 22x3, a hole 27x3, and a hole 13x3 are respectively formed therethrough. These holes 22x3, 27x3 and 13x3 are also the same size, and when viewing the configuration from the side wall 22b (Y axis direction; penetration direction of the respective holes) of the chassis 22, the holes are aligned in a row. In the present embodiment, these holes 22x3, 27x3, and 13x3 constitute a second section L2. The first section L1 and the second section L2 constitute the circulation hole X3. A gap is present between the first section L1 and the second section L2. This gap is formed between the side wall 22b of the chassis 22 and the first standing wall 33b of the heat dissipation member (first support member) 33. Through this gap, the first section L1 and the second section L2 are connected.

However, as shown in FIG. 10, the first section L1 and the second section L2 of the circulation hole X3 are not aligned in a row when viewed from the side wall 22b of the chassis 22 (Y axis direction; direction of penetration of the holes), and are offset in the Z axis direction (thickness direction of the light guide plate 26) so as not to overlap. In other words, when viewing the inside of the liquid crystal display device 10C through the hole 13x3 of the second section L2, it is possible to see the outer side of the first standing wall 33b included in the backlight device 12C. If the first section L1 and the second section L2 are disposed in this manner so as not to overlap when viewed from the side wall 22b of the chassis 22 (Y axis direction; penetration direction of the holes), it becomes difficult for foreign matter such as dust to enter the backlight device 12C from outside through the circulation hole X3. Even if foreign matter such as dust enters the backlight device 12C straight through the second section L2, the first standing wall 33b blocks the path of the foreign matter. Thus, it becomes difficult for foreign matter to enter the air space S1 through the first section L1. Also, it becomes difficult for light emitted from the LEDs 24 to leak outside of the backlight device 12C (liquid crystal display device 10C) through the circulation hole X3. In other words, the side wall 22b is disposed blocking the hole 33x3 of the first section L1, and thus, it is difficult for a portion of the light from within the air space S1 to leak out through the first section L1 and additionally through the second section L2.

A plurality of such circulation holes X3 are provided in the backlight device 12C, and with the circulation holes X3, a rise in temperature inside the air spaces S1 is mitigated. As in Embodiment 1, in the backlight device 12C of the present embodiment, thermal expansion of the outer edges 23d of the optical sheets 23 is mitigated, thus mitigating deformations such as wrinkling and warping in the optical sheets 23.

Embodiment 5

Figure 11:
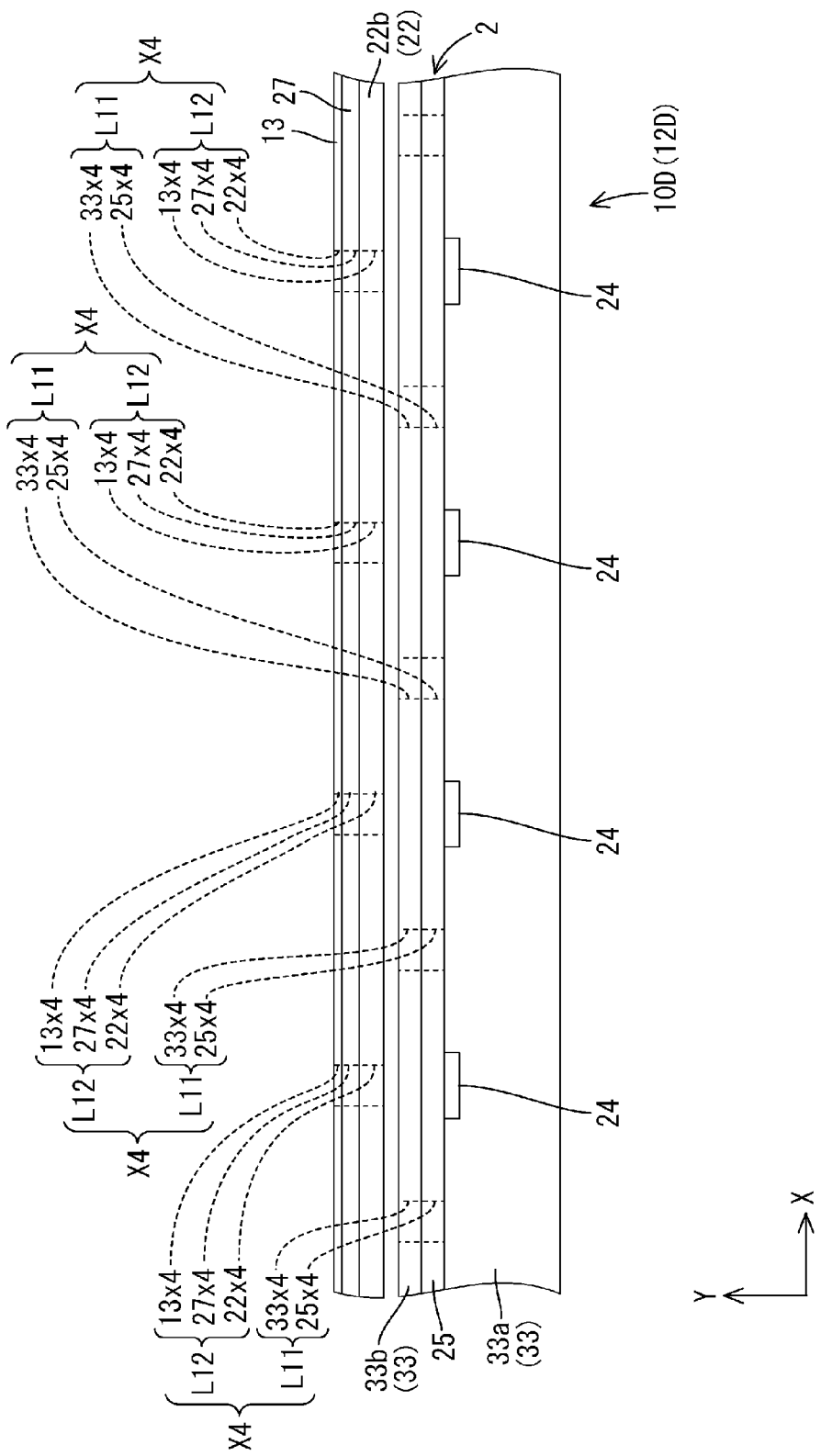
FIG. 11 is a partial plan view showing a plan view configuration of a liquid crystal display device of Embodiment 5.

Next, with reference to FIG. 11, Embodiment 5 will be explained. The basic configuration of a liquid crystal display device 10D of Embodiment 5 shown in FIG. 11 is similar to that of Embodiment 1. However, the configuration of circulation holes X4 in Embodiment 5 is different from those of Embodiment 1. The circulation holes X4 will be mainly described here.

The liquid crystal display device 10D of the present embodiment includes a backlight device 12D. In the LED substrate 25 and the heat dissipation member (first support member) 33 included in the backlight device 12D, a hole 25x4 and a hole 33x4 are respectively provided therethrough. These holes 25x4 and 33x4 are the same size, and when viewing the configuration from the side wall 22b (Y axis direction; penetration direction of the respective holes) of the chassis 22, the holes are aligned in a row. In the present embodiment, these holes 25x4 and 33x4 constitute a first section L11. On the other hand, in the side wall 22b of the chassis 22, the frame 27, and the bezel 13, a hole 22x4, a hole 27x4, and a hole 13x4 are respectively formed therethrough. These holes 22x4, 27x4 and 13x4 are also the same size, and when viewing the configuration from the side wall 22b (Y axis direction) of the chassis 22, the holes are aligned in a row. In the present embodiment, these holes 22x4, 27x4, and 13x4 constitute a second section L12. The first section L11 and the second section L12 described above constitute the circulation hole X4. A gap is present between the first section L11 and the second section L12. This gap is formed between the side wall 22b of the chassis 22 and the first standing wall 33b of the heat dissipation member (first support member) 33. Through this gap, the first section L11 and the second section L12 are connected.

However, as shown in FIG. 11, the first section L11 and the second section L12 in the circulation hole X4 are not aligned in a row when viewed from the side wall 22b of the chassis 22 (Y axis direction; direction of penetration of the holes), and are offset in the X axis direction (longer side direction of the light guide plate 26) so as not to overlap. In other words, when viewing the inside of the liquid crystal display device 10D through the hole 13x4 of the second section L12, it is possible to see the outer side of the first standing wall 33b included in the backlight device 12D. If the first section L11 and the second section L12 are disposed in this manner so as not to overlap when viewed from the side wall 22b of the chassis 22 (Y axis direction; penetration direction of the holes), it becomes difficult for foreign matter such as dust to enter the backlight device 12D from outside through the circulation hole X4. Even if foreign matter such as dust enters the backlight device 12D from outside, straight through the second section L12, the first standing wall 33b blocks the path of the foreign matter. Thus, it becomes difficult for foreign matter to enter the air space S1 through the first section L11. Also, it becomes difficult for light emitted from the LEDs 24 to leak outside of the backlight device 12D (liquid crystal display device 10D) through the circulation hole X4. In other words, the side wall 22b is disposed blocking the hole 33x4 of the first section L11, and thus, it is difficult for the light from within the air space S1 to leak out through the first section L11 and additionally through the second section L12.

A plurality of such circulation holes X4 are provided in the backlight device 12D, and with the circulation holes X4, a rise in temperature inside the air spaces S1 is mitigated. As in Embodiment 1, in the backlight device 12D of the present embodiment, thermal expansion of the outer edges 23d of the optical sheets 23 is mitigated, thus mitigating deformations such as wrinkling and warping in the optical sheets 23.

Embodiment 6

Figure 12:
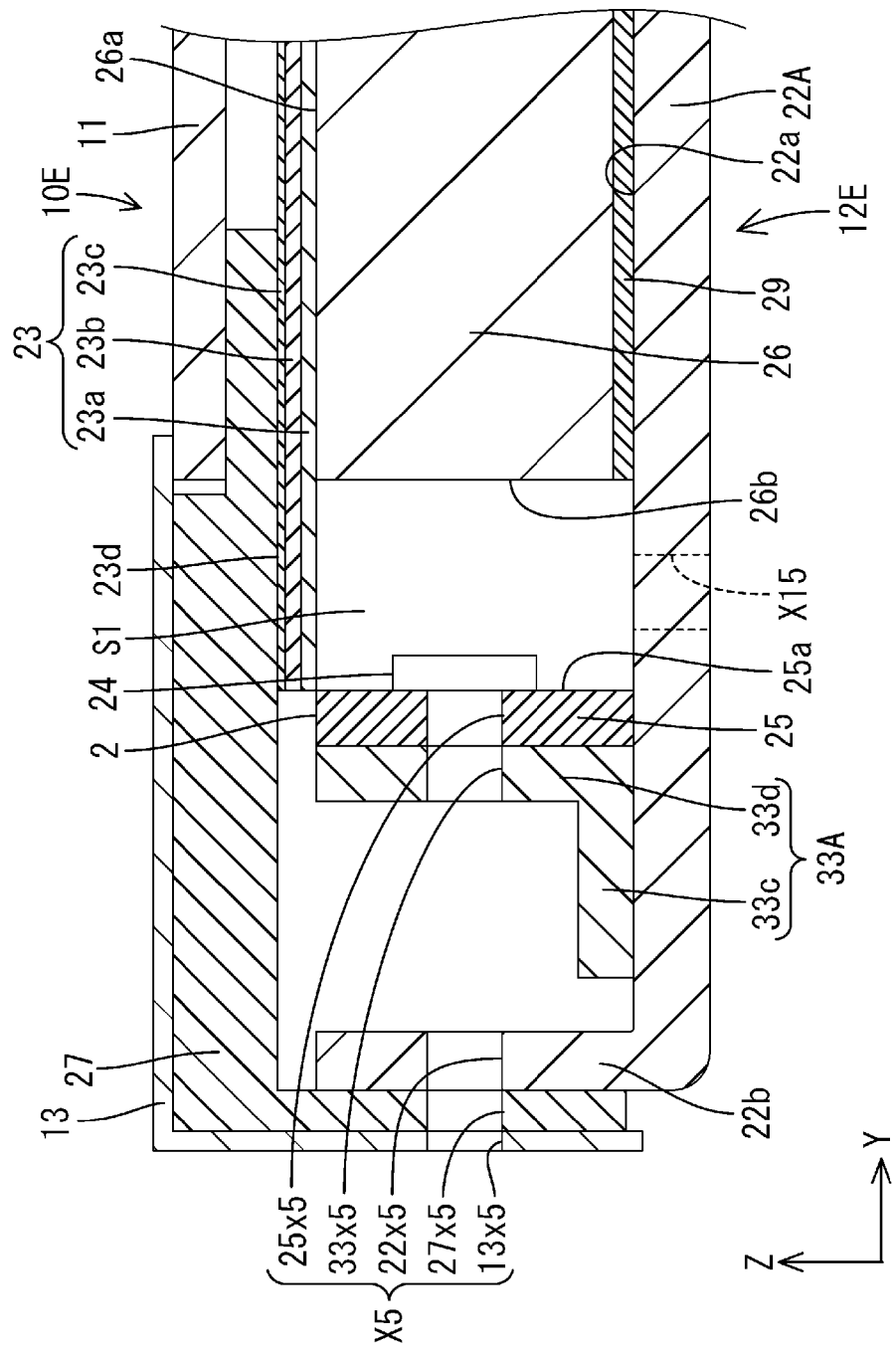
FIG. 12 is a partial cross-sectional view showing a cross-sectional configuration of a liquid crystal display device of Embodiment 6 along the shorter side direction.

Next, with reference to FIG. 12, Embodiment 6 will be explained. The basic configuration of a liquid crystal display device 10E of Embodiment 6 shown in FIG. 12 is similar to that of Embodiment 1. However, the configuration of a heat dissipation member (second support member) 33A in Embodiment 6, a configuration of circulation holes X5 and a bottom plate 22a of a chassis 22A, and the like are different from those of Embodiment 1. Here, the heat dissipation member 33A and the circulation hole X5 will mainly be described.

The liquid crystal display device 10E of the present embodiment includes a backlight device 12E. A heat dissipation member (second support member) 33A included in the backlight device 12E is constituted of a flat second attaching part 33c and a second standing wall 33d that rises up from a front end of the second attaching part 33c. The heat dissipation member 33A is made of a metal such as aluminum with excellent heat dissipation properties, as in that of Embodiment 1. The second attaching part 33c is disposed in the space between the side wall 22b and the side edge face 26b of the light guide plate 26 within the chassis 22A, and the front end of the second attaching part 33c faces the side edge face 26b of the light guide plate 26, and the rear end thereof faces the side wall 22b. In other words, the heat dissipation member 33A of the present embodiment differs from that of Embodiment 1 in that the front end thereof is not interposed between the light guide plate 26 and the bottom plate 22a. An LED substrate 25 is also attached to the second standing wall 33d of the present embodiment. The LED substrate 25 is attached to the second standing wall 33d such that the substrate surface 25a thereof faces the side edge face 26b of the light guide plate 26. The method of fixing the LED substrate 25 to the heat dissipation member 33A is similar to that of Embodiment 1. Protrusions 22c such as those of Embodiment 1 are not provided on the bottom plate 22a of the chassis 22A of the present embodiment, and the light guide plate 26 is installed on the bottom plate 22a through the reflective sheet 29. The chassis 22A is similar to that of Embodiment 1 except that the protrusions 22c are not provided.

As in Embodiment 1, the backlight device 12E of the present embodiment also has an air space S1 surrounded by the substrate surface 25a of the LED substrate 25, the side edge face 26b of the light guide plate 26, the portion of the bottom plate 22a between these, and the outer edges 23d of the optical sheets 23. A circulation hole X5 is provided so as to allow airflow between the air in the air space S1 and the air on the outside of the backlight device 12E (liquid crystal display device 10E). A hole 25x5 and a hole 33x5 are provided respectively through the LED substrate 25 and the second standing wall 33d of the heat dissipation member 33A, and a hole 22x5, a hole 27x5, and a hole 13x5 are respectively provided through the side wall 22b of the chassis 22A, the frame 27, and the bezel 13. These holes 25x5, 33x5, 22x5, 27x5, and 13x5 are the same size, and when viewing the configuration from the side wall 22b (Y axis direction; direction of penetration of the respective holes) of the chassis 22A, the holes are aligned in a row.

A plurality of such circulation holes X5 are provided in the backlight device 12E, and with the circulation holes X5, a rise in temperature inside the air spaces S1 is mitigated. As in Embodiment 1, in the backlight device 12E of the present embodiment, thermal expansion of the outer edges 23d of the optical sheets 23 is mitigated, thus mitigating deformations such as wrinkling and warping in the optical sheets 23. In other embodiments, as shown with the dotted lines in FIG. 12 as an imaginary hole, a circulation hole X15 may be provided in the bottom plate 22a in the area thereof between the LED substrate 25 and the light guide plate 26.

Embodiment 7

Figure 13:
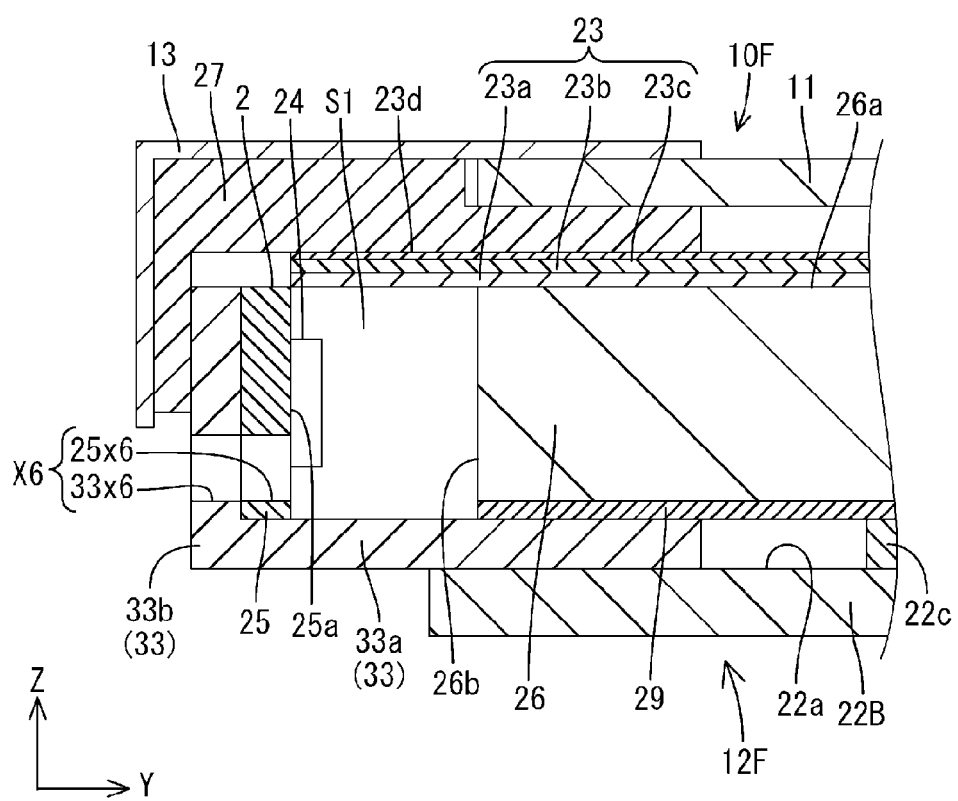
FIG. 13 is a partial cross-sectional view showing a cross-sectional configuration of a liquid crystal display device of Embodiment 7 along the shorter side direction.

Next, with reference to FIG. 13, Embodiment 7 will be explained. The basic configuration of a liquid crystal display device 10F of Embodiment 7 shown in FIG. 13 is similar to that of Embodiment 1. However, the configuration of the chassis 22, the configuration of the circulation hole X6, and the like in Embodiment 7 are different from those of Embodiment 1. The chassis 22B and the circulation hole X6 will be mainly described here.

The liquid crystal display device 10F of the present embodiment includes a backlight device 12F. The chassis 22B included in the backlight device 12F is not provided with side walls 22b where the LED substrates 25 are provided, unlike in Embodiment 1. Thus, the heat dissipation member (first support member) 33 supporting the LED substrate 25 is partially exposed from inside the chassis 22B. The frame 27 and the bezel 13 are attached to a first standing wall 33b so as to partially cover the first standing wall 33b of the exposed heat dissipation member 33.

In the backlight device 12F configured in such a way, the LED substrate 25, and the first standing wall 33b of the heat dissipation member 33 are respectively provided with a hole 25x6 and a hole 33x6, which are formed therethrough. The circulation hole X6 is constituted of the hole 25x6 and the hole 33x6. The circulation hole X6 is provided in a position in the first standing wall 33b where the frame 27 and the bezel 13 are not present. The hole 25x6 and the hole 33x6 are the same size, and when viewed from the first standing wall 33b of the heat dissipation member 33 (Y axis direction; penetration direction of the respective holes), the holes are aligned in a row.

A plurality of such circulation holes X6 are provided in the backlight device 12F, and with the circulation holes X6, a rise in temperature inside the air spaces S1 is mitigated. As in Embodiment 1, in the backlight device 12F of the present embodiment, thermal expansion of the outer edges 23d of the optical sheets 23 is mitigated, thus mitigating deformations such as wrinkling and warping in the optical sheets 23.

Embodiment 8

Figure 14:
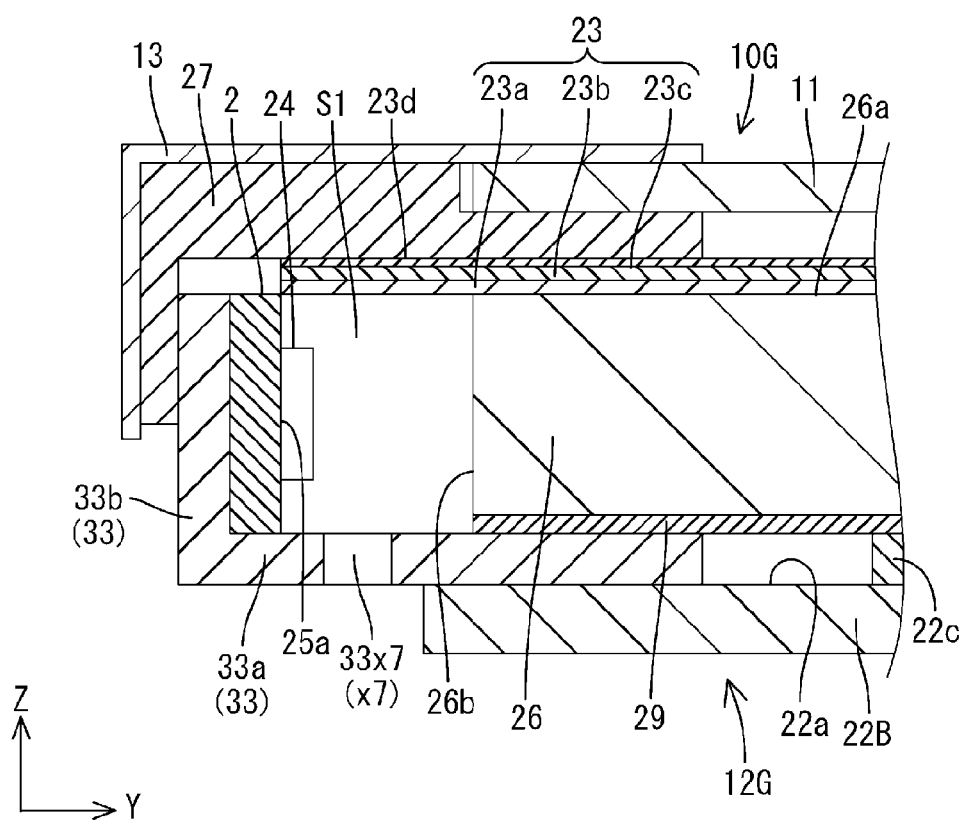
FIG. 14 is a partial cross-sectional view showing a cross-sectional configuration of a liquid crystal display device of Embodiment 8 along the shorter side direction.

Next, with reference to FIG. 14, Embodiment 8 will be explained. The basic configuration of a liquid crystal display device 10G of Embodiment 8 shown in FIG. 14 is similar to that of Embodiment 7. However, the configuration of circulation holes X7 in Embodiment 8 is different from those of Embodiment 7. The circulation holes X7 will be mainly described here.

The liquid crystal display device 10G of the present embodiment includes a backlight device 12G. A first attaching part 33a of a heat dissipation member (first support member) 33, which is included in the backlight device 12G, has a hole 33x7 therethrough. The hole 33x7 is a circulation hole X7 for allowing airflow between air in the air space S1 and air outside of the backlight device 12G. A plurality of such circulation holes X7 are provided in the backlight device 12G, and with the circulation holes X7, a rise in temperature inside the air spaces S1 is mitigated. As in Embodiment 7, in the backlight device 12G of the present embodiment, thermal expansion of the outer edges 23d of the optical sheets 23 is mitigated, thus mitigating deformations such as wrinkling and warping in the optical sheets 23.

Modification Example

Figure 15:
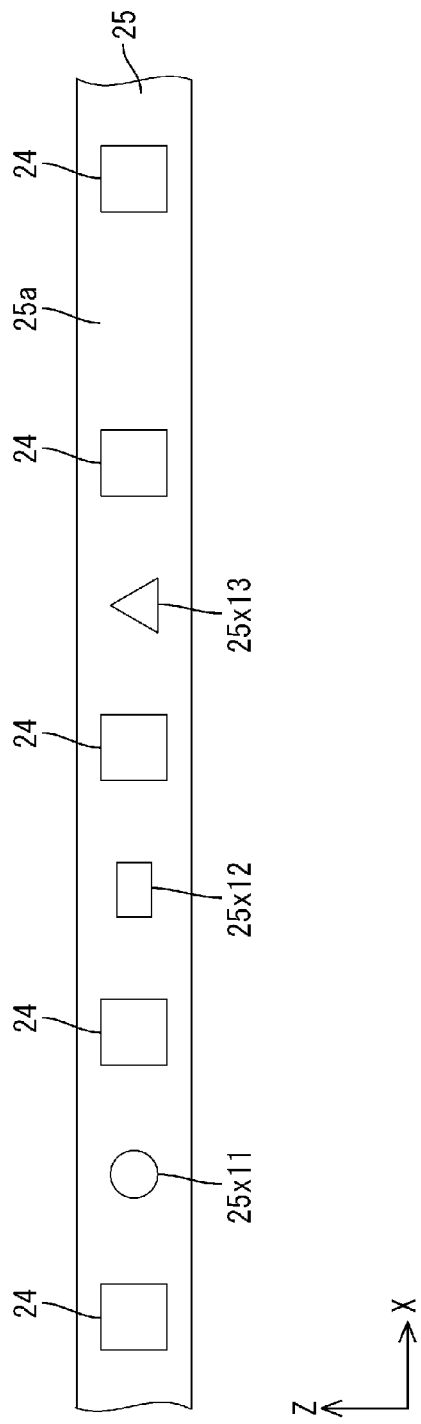
FIG. 15 is a plan view of an LED substrate showing a modification example of holes.

Here, a shape of the circulation holes will be described with reference to FIG. 15. FIG. 15 shows a hole 25x11, a hole 25x12, and a hole 25x13 provided in an LED substrate 25 as a portion of the circulation hole. As shown in FIG. 15, as viewed from the substrate surface 25a, the hole 25x11 is a circle, the hole 25x12 is a rectangle, and a hole 25x13 is a triangle. There is no special limitation for the shape of the circulation hole, which may be appropriately set according to the purpose.

Figure 16:
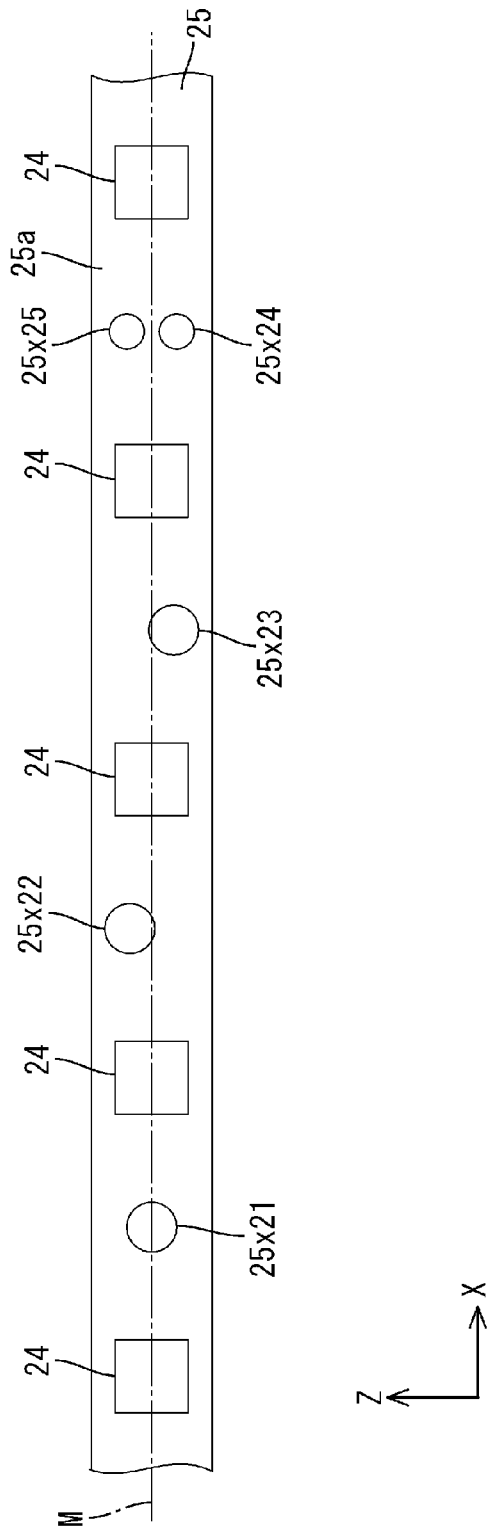
FIG. 16 is a plan view of an LED substrate showing a modification example of holes.

Next, with reference to FIG. 16, the arrangement of the holes provided in the LED substrate 25 will be described. FIG. 16 shows a hole 25x21, a hole 25x22, a hole 25x23, a hole 25x24, and a hole 25x25 provided in an LED substrate 25 as a portion of the circulation hole. As shown in FIG. 16, a plurality of LEDs 24 are provided at an even distance therebetween on the LED substrate 25. The LEDs 24 are installed on the center of the LED substrate 25 in the widthwise direction thereof (Z axis direction). In other words, the respective LEDs 24 are provided on the LED substrate 25 so as to be aligned on a center line M. There is no special limitation on the position of the holes provided on the LED substrate 25, which may be appropriately set according to the purpose. The holes may be provided on the center line M as in the hole 25x21, the holes may be provided above the center line M as in the hole 25x22, or the holes may be provided below the center line M as in the hole 25x23. The holes may also be adjacent to each other in the up and down direction (widthwise direction) across the center line M as in the hole 25x25 and the hole 25x24.

Figure 17:
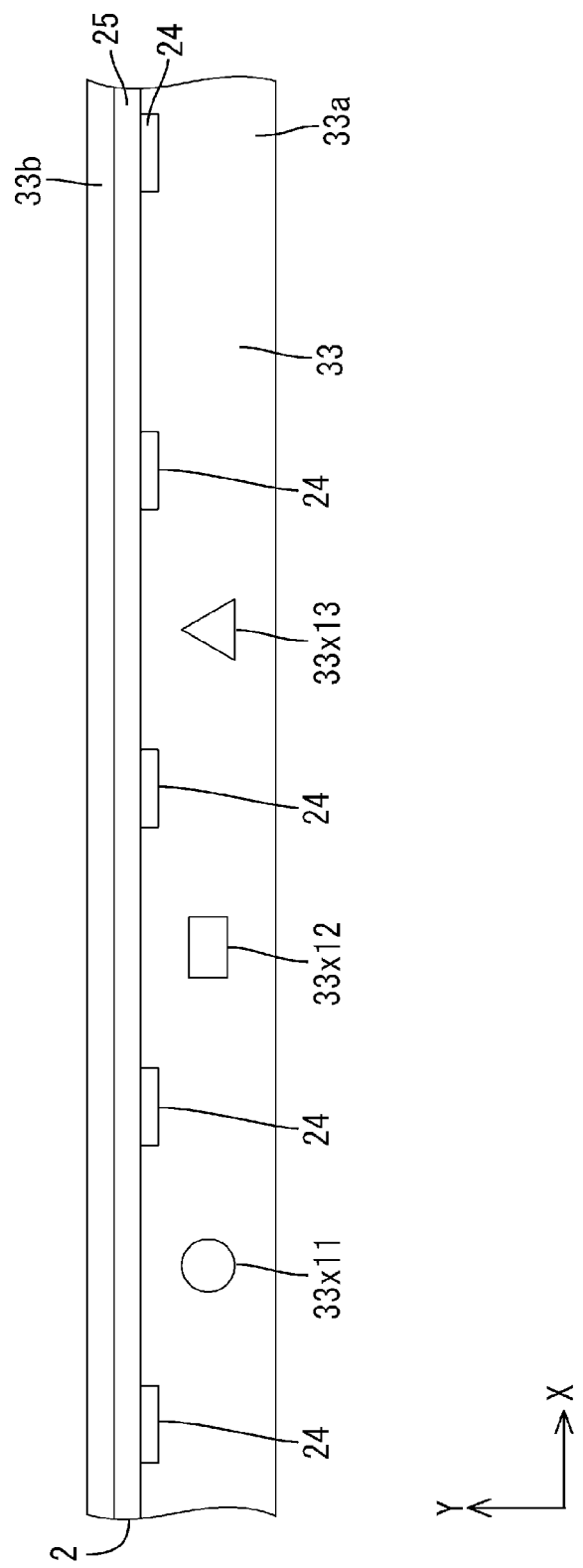
FIG. 17 is a plan view of a heat dissipation member showing a modification example of holes.

Next, with reference to FIG. 17, the shape of the holes provided in the heat dissipation member 33 will be described. In FIG. 17, a hole 33x11, a hole 33x12, and a hole 33x13, which form a part of the circulation hole and are provided in the first attaching part 33a of the heat dissipation member 33, are shown. As shown in FIG. 17, when viewing the first attaching part 33a in a plan view, the hole 33x11 is a circle, the hole 33x12 is a rectangle, and the hole 33x13 is a triangle. Thus, the shape of the circulation holes provided in the heat dissipation member and the like has no special limitation, and may be appropriately set according to the purpose.

Figure 18:
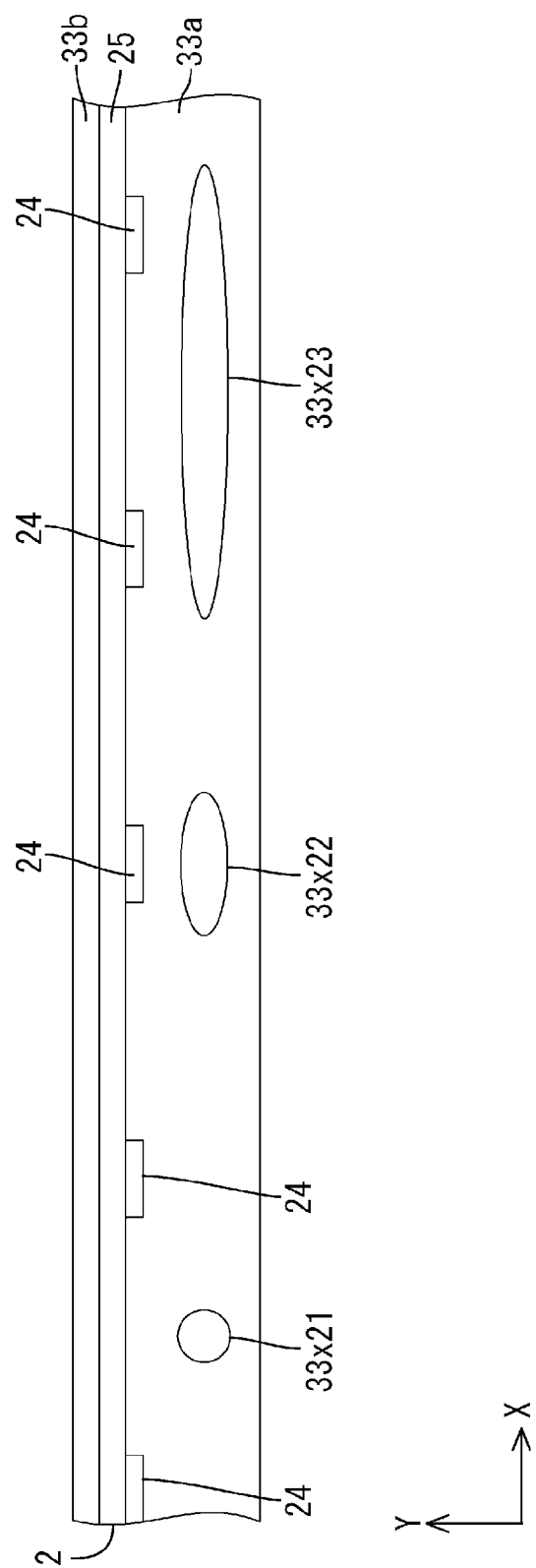
FIG. 18 is a plan view of a heat dissipation member showing a modification example of holes.

Next, with reference to FIG. 18, the shape of the holes provided in the heat dissipation member 33 and the positions thereof will be described. In FIG. 18, a hole 33x21, a hole 33x22, and a hole 33x23, which form portions of the circulation holes and are provided in the first attaching part 33a of the heat dissipation member 33, are shown. The hole 33x21 is a circle and is disposed between adjacent LEDs 24 on the LED substrate 25. By contrast, the hole 33x22 is an oval (ellipse) disposed in front of an LED 24. The hole 33x23 is an oval (ellipse) and is disposed in front of two LEDs 24. In this manner, there is no special limitation on the shape and position of the circulation holes provided in the first attaching part 33a of the heat dissipation member 33, and the shape and position is appropriately set according to the purpose.

Figure 19:
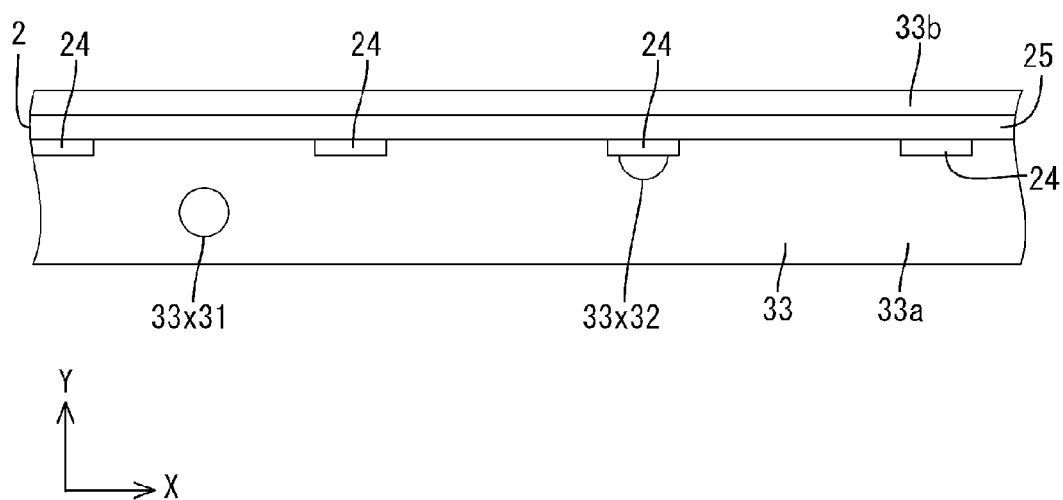
FIG. 19 is a plan view of a heat dissipation member showing a modification example of holes.

Next, with reference to FIG. 19, the position of the holes provided in the heat dissipation member will be described. In FIG. 19, a hole 33x31 and a hole 33x32, which form a part of the circulation hole and are provided in the first attaching part 33a of the heat dissipation member 33, are shown. The hole 33x31 is disposed between adjacent LEDs 24 and further to the front than the LEDs 24. By contrast, the hole 33x32 is disposed directly below an LED 24. In this manner, there is no special limitation on the position of the circulation holes provided in the first attaching part 33a of the heat dissipation member 33, and the position may be appropriately set according to the purpose.

Other Embodiments

The present invention is not limited to the embodiments shown in the drawings and described above, and the following embodiments are also included in the technical scope of the present invention, for example.

(1) In the embodiments above, the LED substrate is supported by a heat dissipation member, but in other embodiments, the LED substrate may be supported by a member other than a heat dissipation member.

(2) In the embodiments above, the optical sheets include a diffusion sheet, a lens sheet, and a reflective polarizing sheet layered in this order, but in other embodiments, a configuration other than this may be used.

(3) In the embodiments above, the outer edge of the optical sheets is set such that the tip thereof reaches the LED substrate, but in other embodiments, the outer edge of the optical sheets may be on the end of the LED substrate, or there may be a gap between the outer edge of the optical sheets and the LED substrate, for example.

Figure 20:
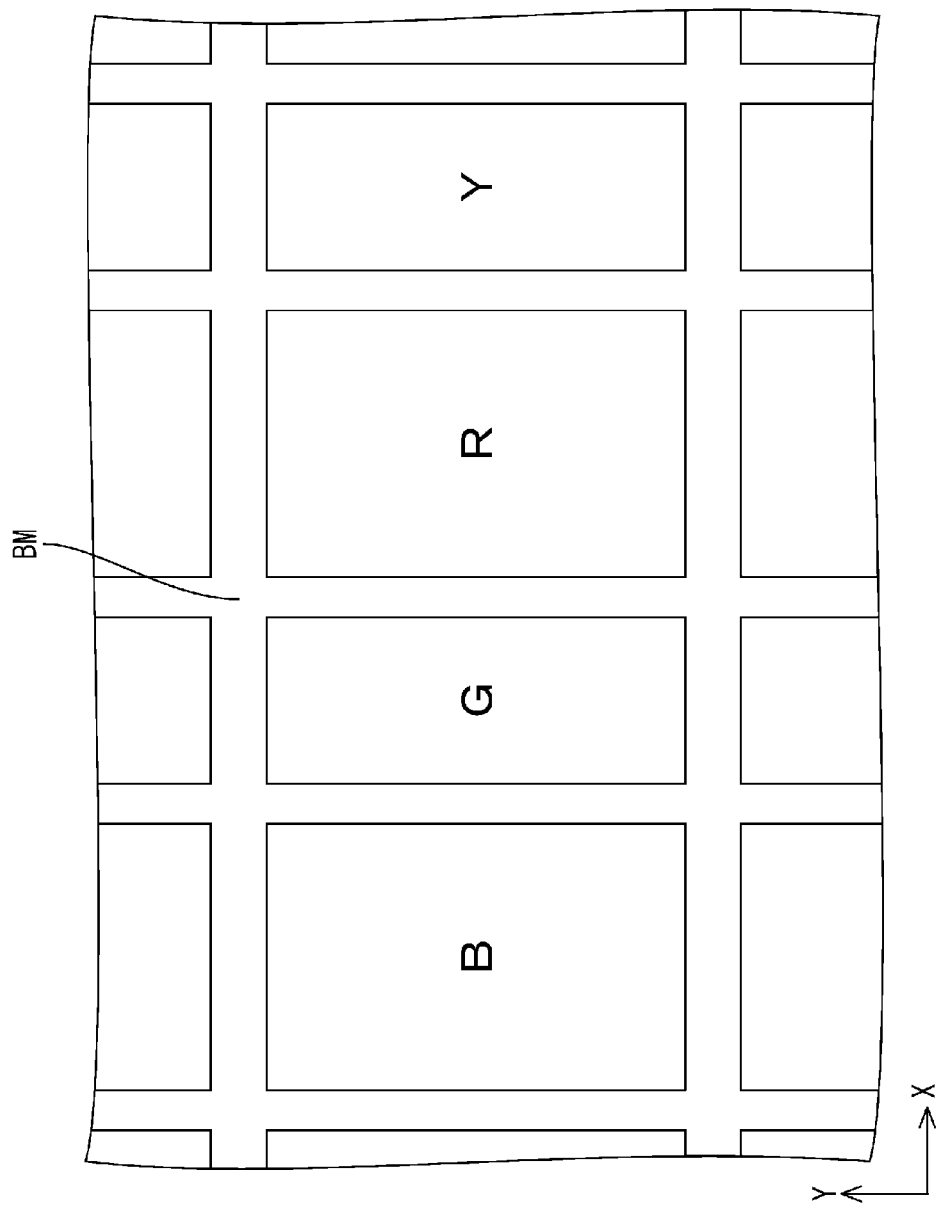
FIG. 20 is a magnified plan view showing a plan view configuration of a CF substrate according to Embodiment 9 of the present invention.

(4) Besides the configurations of the embodiments above, the order of the respective colored portions R, G, B, and Y of the color filters may be appropriately modified, and as shown in FIG. 20, for example, a configuration in which the blue colored portion B, the green colored portion G, the red colored portion R, and the yellow colored portion Y are aligned in this order from the left of the page in the X axis direction is also included in the present invention.

Figure 21:
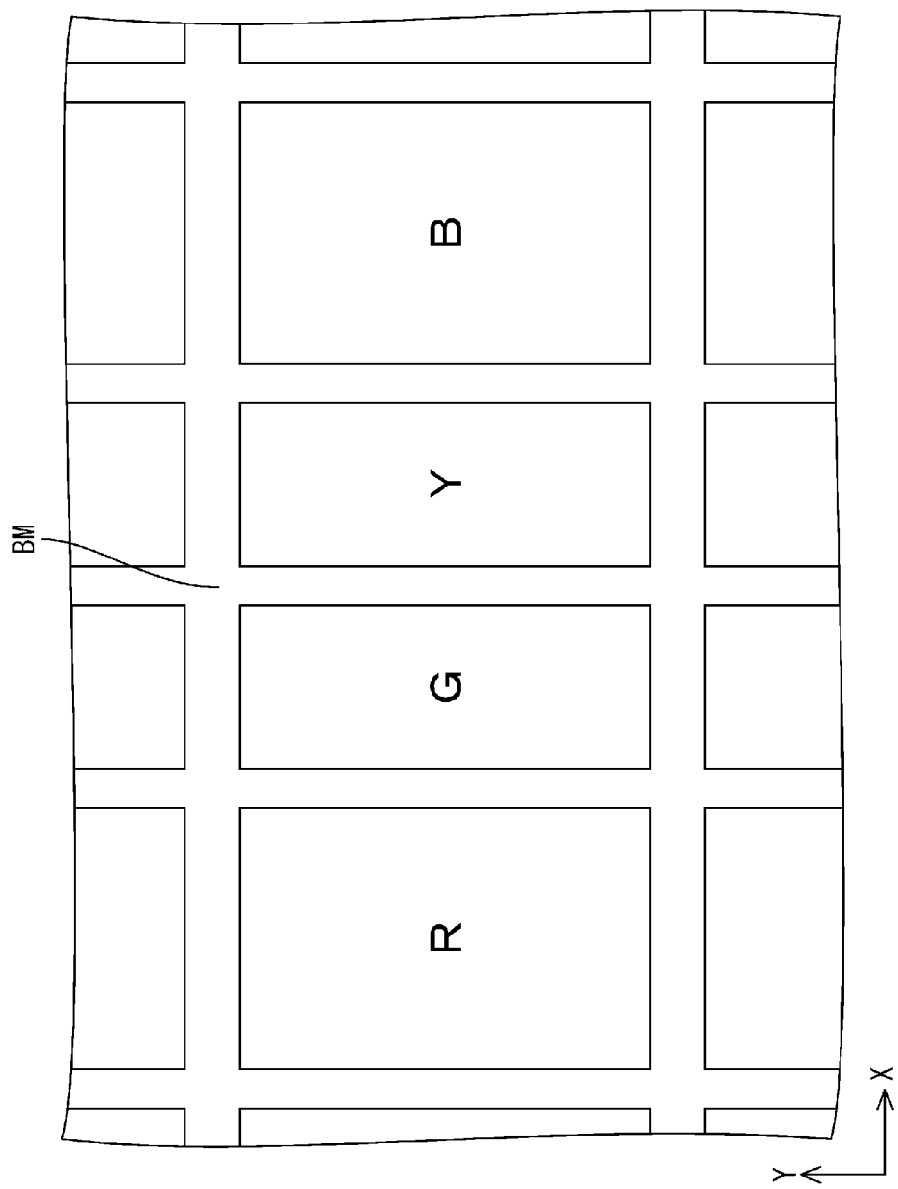
FIG. 21 is a magnified plan view showing a plan view configuration of a CF substrate according to Embodiment 10 of the present invention.

(5) Besides the configuration of (4), as shown in FIG. 21, for example, a configuration in which the respective colored portions R, G, B, and Y of the color filters are aligned in the order of the red colored portion R, the green colored portion G, the yellow colored portion Y, and the blue colored portion B from the left of the page in the X axis direction is also included in the present invention.

Figure 22:
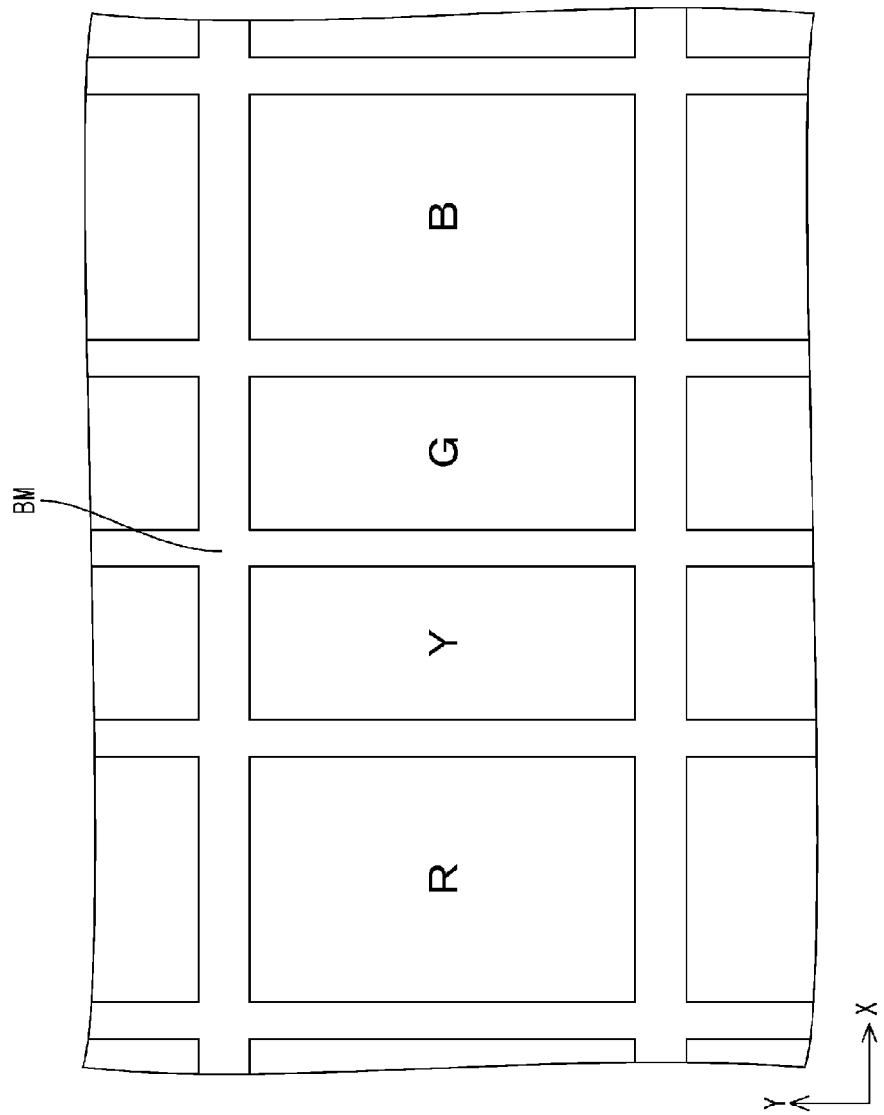
FIG. 22 is a magnified plan view showing a plan view configuration of a CF substrate according to Embodiment 11 of the present invention.

(6) Besides the configurations of (4) and (5), as shown in FIG. 22, for example, a configuration in which the respective colored portions R, G, B, and Y of the color filters are aligned in the order of the red colored portion R, the yellow colored portion Y, the green colored portion G, and the blue colored portion B from the left of the page in the X axis direction is also included in the present invention.

Figure 23:
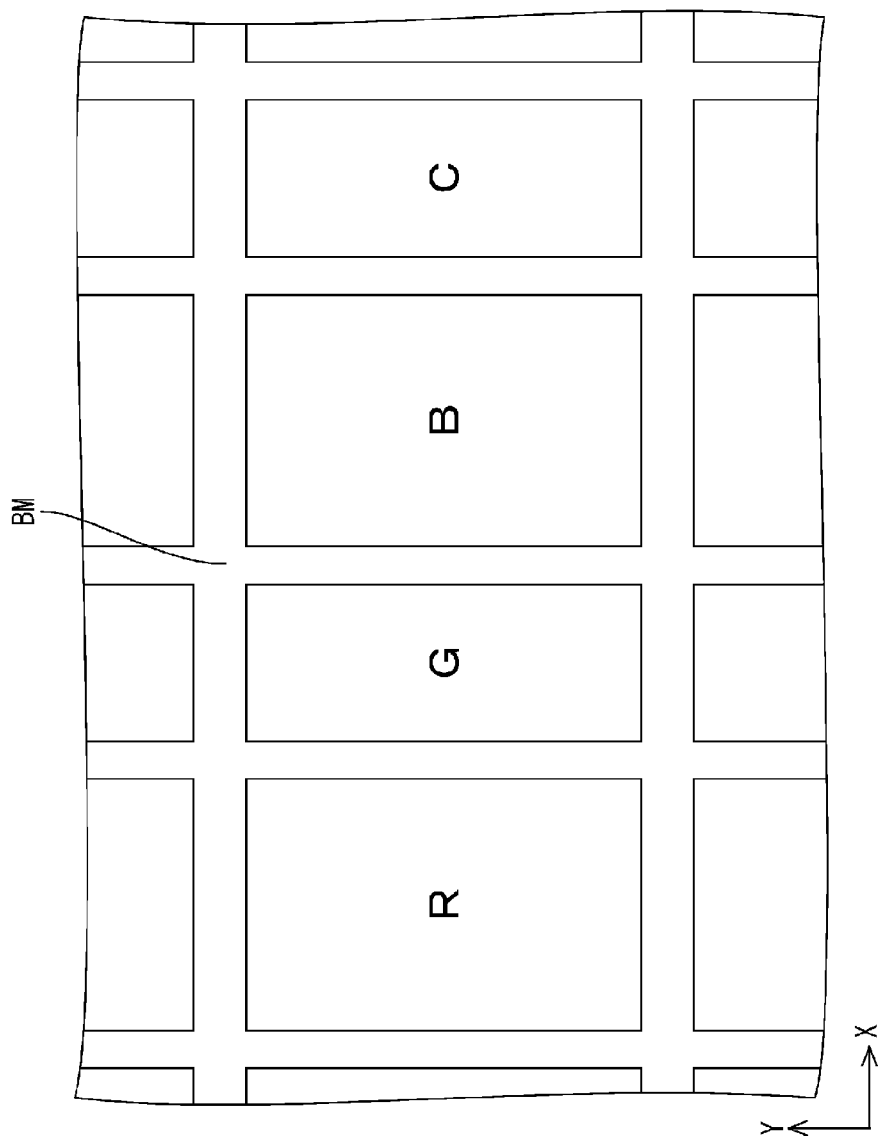
FIG. 23 is a magnified plan view showing a plan view configuration of a CF substrate according to Embodiment 12 of the present invention.

(7) In the embodiments above, the colored portions of the color filters were configured to have yellow (Y), in addition to red (R), green (G), and blue (B), which are the three primary colors of light, but as shown in FIG. 23, it is also possible to add cyan colored portions C, instead of the yellow colored portions.

Figure 24:
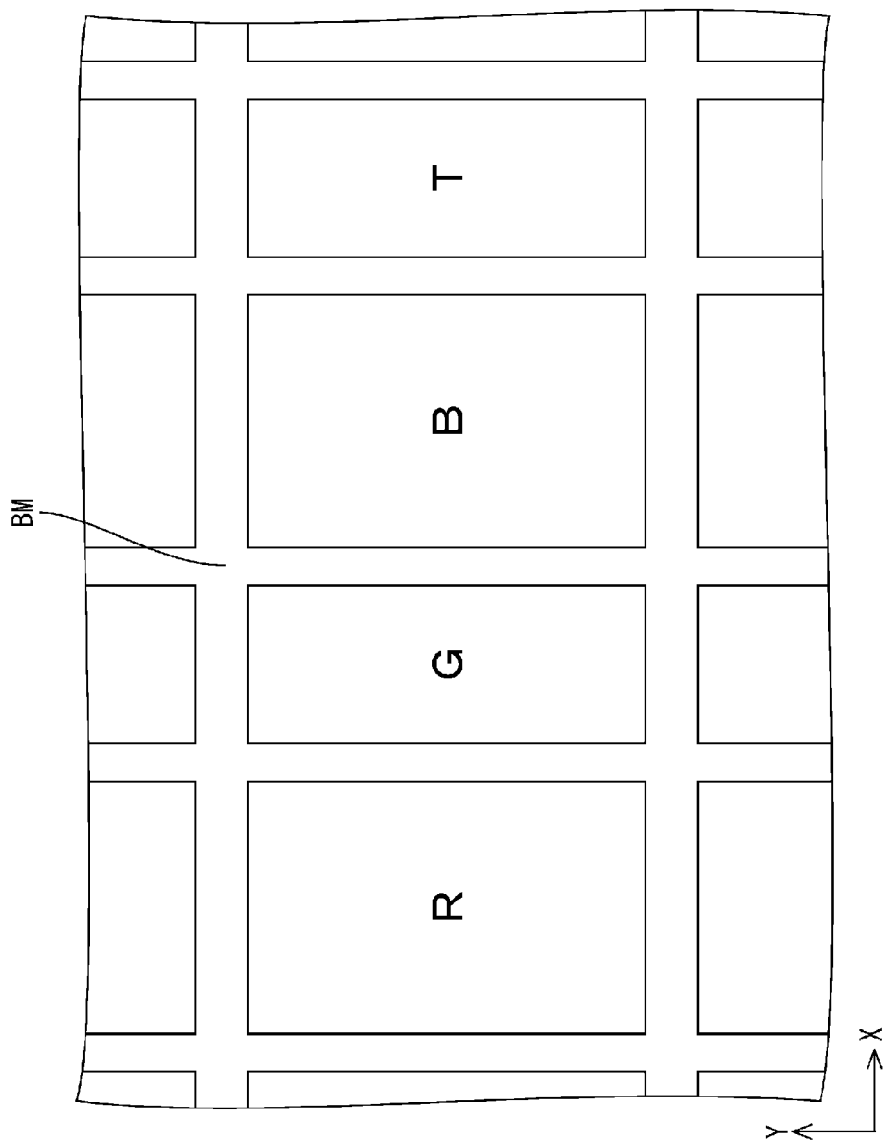
FIG. 24 is a magnified plan view showing a plan view configuration of a CF substrate according to Embodiment 13 of the present invention.

(8) In the embodiments above, the colored portions of the color filters had four colors, but as shown in FIG. 24, it is also possible to dispose transmissive portions T that do not color the transmitted light in place of the yellow colored portions. The transmissive portions T transmit all wavelengths of at least visible light in a substantially equal manner, and thus do not color the transmitted light to a specific color.

Figure 25:
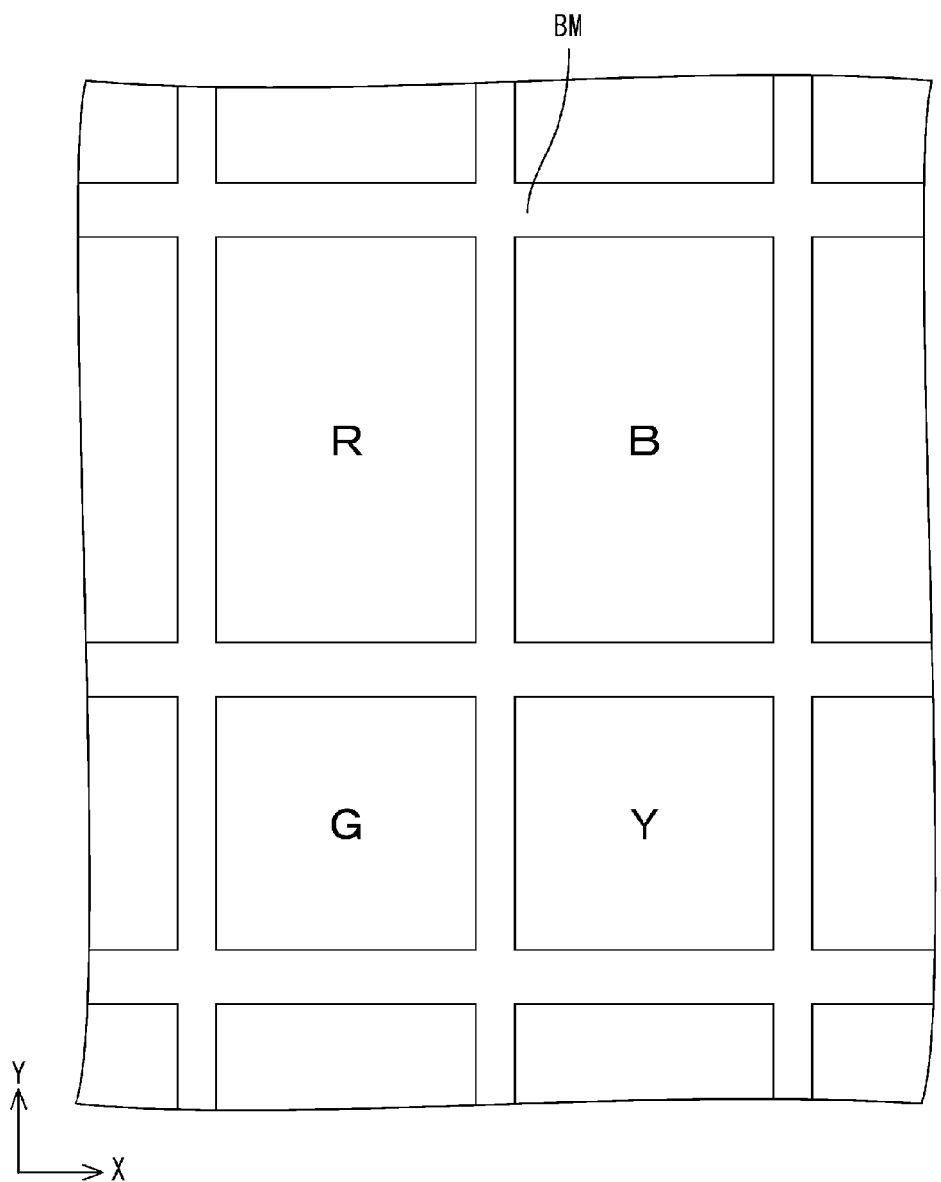
FIG. 25 is a magnified plan view showing a plan view configuration of a CF substrate according to Embodiment 14 of the present invention.

(9) In the embodiments above, the configuration in which the colored portions of four colors R, G, B, and Y that constitute the color filters are arranged along the row direction was described as an example, but it is also possible to arrange the colored portions of four colors R, G, B, and Y in a matrix. Specifically, as shown in FIG. 25, the four colored portions R, G, B, and Y are arranged in a matrix with the X axis direction being the row direction and the Y axis direction being the column direction, and while the row direction (X axis direction) sizes of the respective colored portions R, G, B, and Y are the same, the column direction (Y axis direction) sizes of the colored portions R, G, B, and Y disposed in adjacent rows differ. In the row with the relatively large column direction size, the red colored portion R and the blue colored portion B are disposed adjacent to each other along the row direction, and in the row with the relatively small column direction size, the green colored portion G and the yellow colored portion Y are disposed adjacent to each other along the row direction. In other words, a first row in which red colored portions R and blue colored portions B are arranged alternately in the row direction and in which the column direction sizes are relatively large, and a second row in which green colored portions G and yellow colored portions Y are arranged alternately in the row direction and in which the column direction sizes are relatively small, are provided repeatedly and alternately in the column direction. Accordingly, the area of the red colored portion R and the blue colored portion B is larger than the area of the green colored portion G and the yellow colored portion Y. The green colored portion G is disposed adjacent to the red colored portion R in the column direction, and the yellow colored portion Y is disposed adjacent to the blue colored portion B in the column direction.

Figure 26:
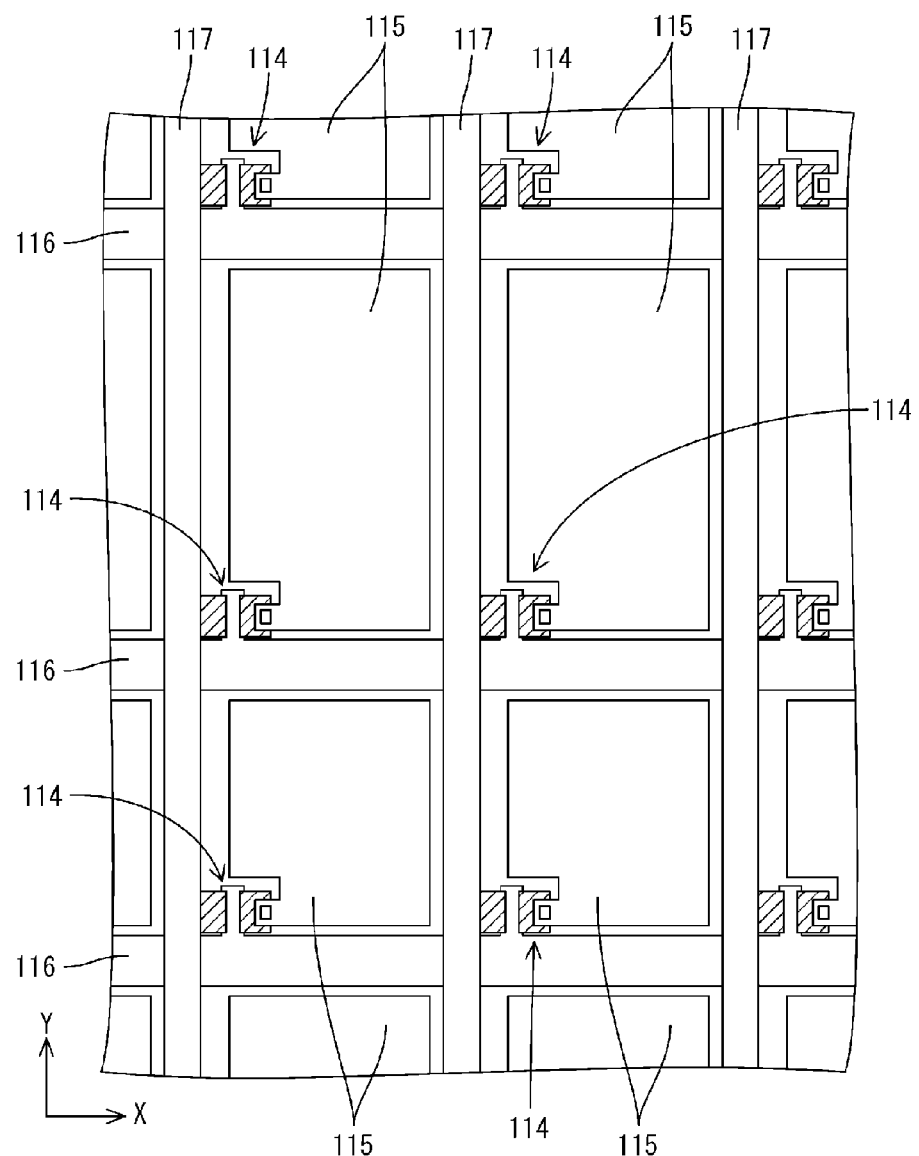
FIG. 26 is a magnified plan view showing a plan view configuration of an array substrate according to Embodiment 14 of the present invention.

Because of the above-mentioned configuration of the color filters, as shown in FIG. 26, the array substrate is configured such that the respective pixel electrodes 115 disposed in adjacent rows have different column direction sizes from each other. That is, the area of pixel electrodes 115 that respectively face the red colored portions R and the blue colored portions B is larger than the area of pixel electrodes 115 that respectively face the yellow colored portions Y and the green colored portions G. The film thicknesses of the respective colored portions R, G, B, and Y are the same as each other. Also, while the source wiring lines 117 are all disposed at the same pitch, the gate wiring lines 116 are disposed at two different pitches in accordance with the column direction sizes of the pixel electrodes 115. FIGS. 25 and 26 show a case in which the area of the red colored portions R and the blue colored portions B is approximately 1.6 times larger than the area of the yellow colored portions Y and the green colored portions G.

Figure 27:
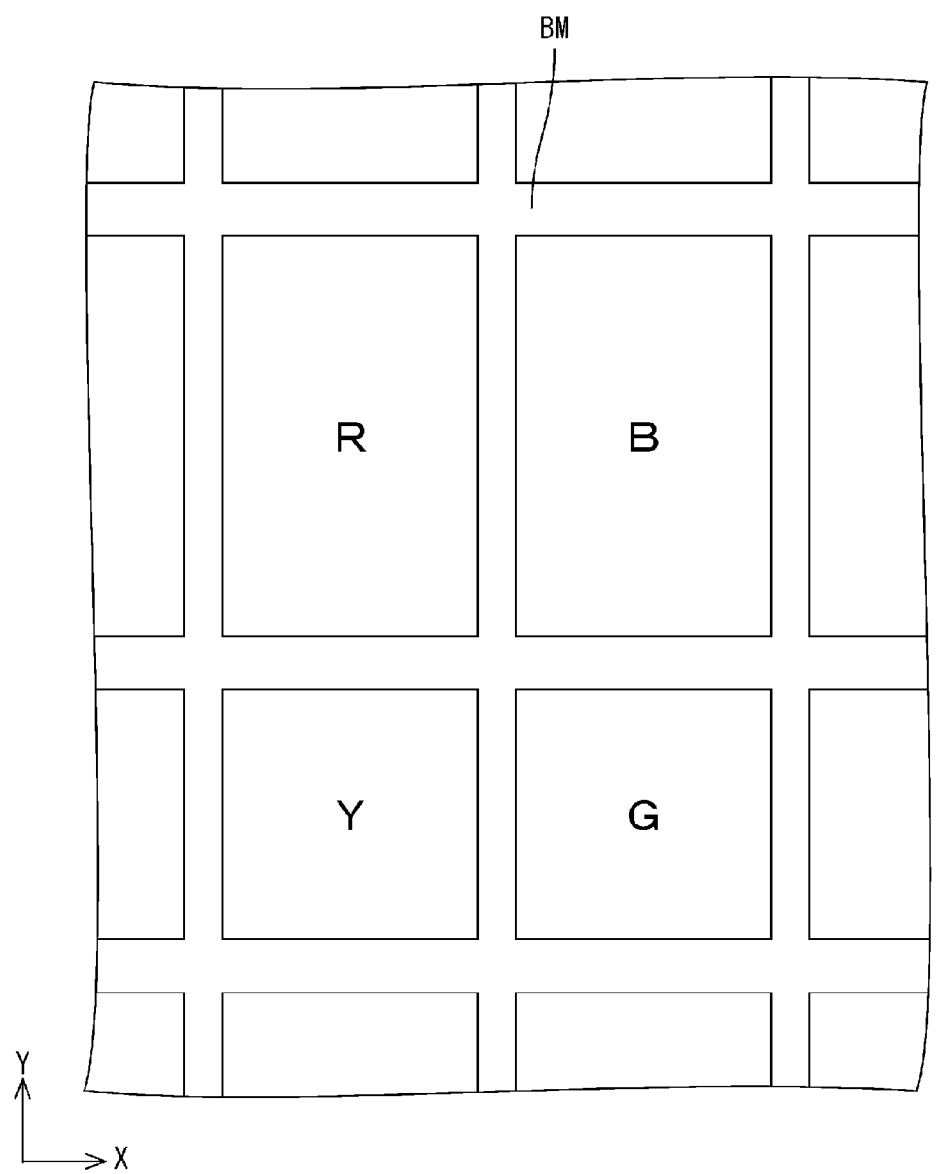
FIG. 27 is a magnified plan view showing a plan view configuration of a CF substrate according to Embodiment 15 of the present invention.

(10) As another modification example of the above-mentioned (9), as shown in FIG. 27, with respect to the color filters, it is also possible to employ a configuration in which the yellow colored portion Y is disposed adjacent to the red colored portion R in the column direction, and the green colored portion G is disposed adjacent to the blue colored portion B in the column direction.

Figure 28:
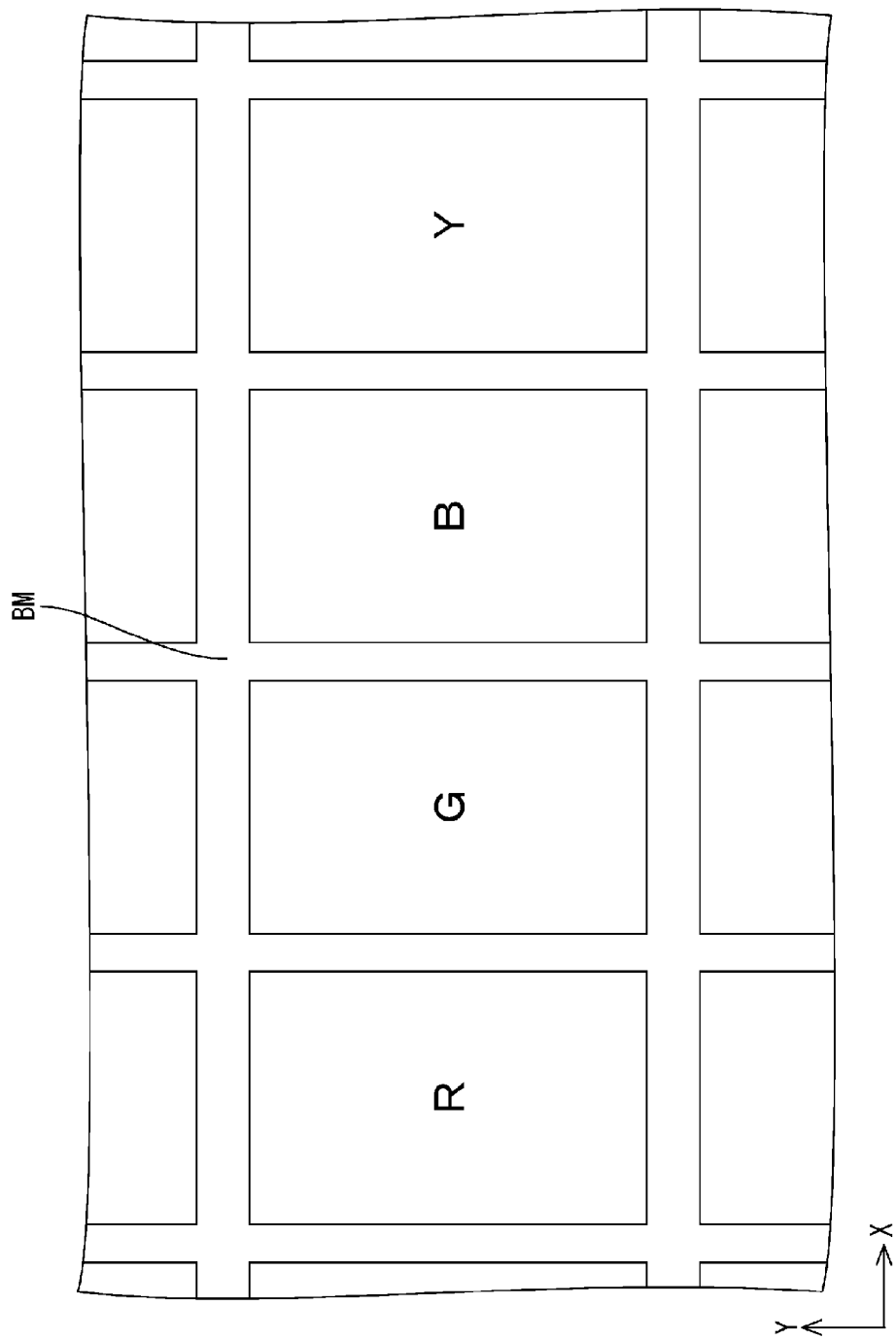
FIG. 28 is a magnified plan view showing a plan view configuration of a CF substrate according to Embodiment 16 of the present invention.
Figure 29:
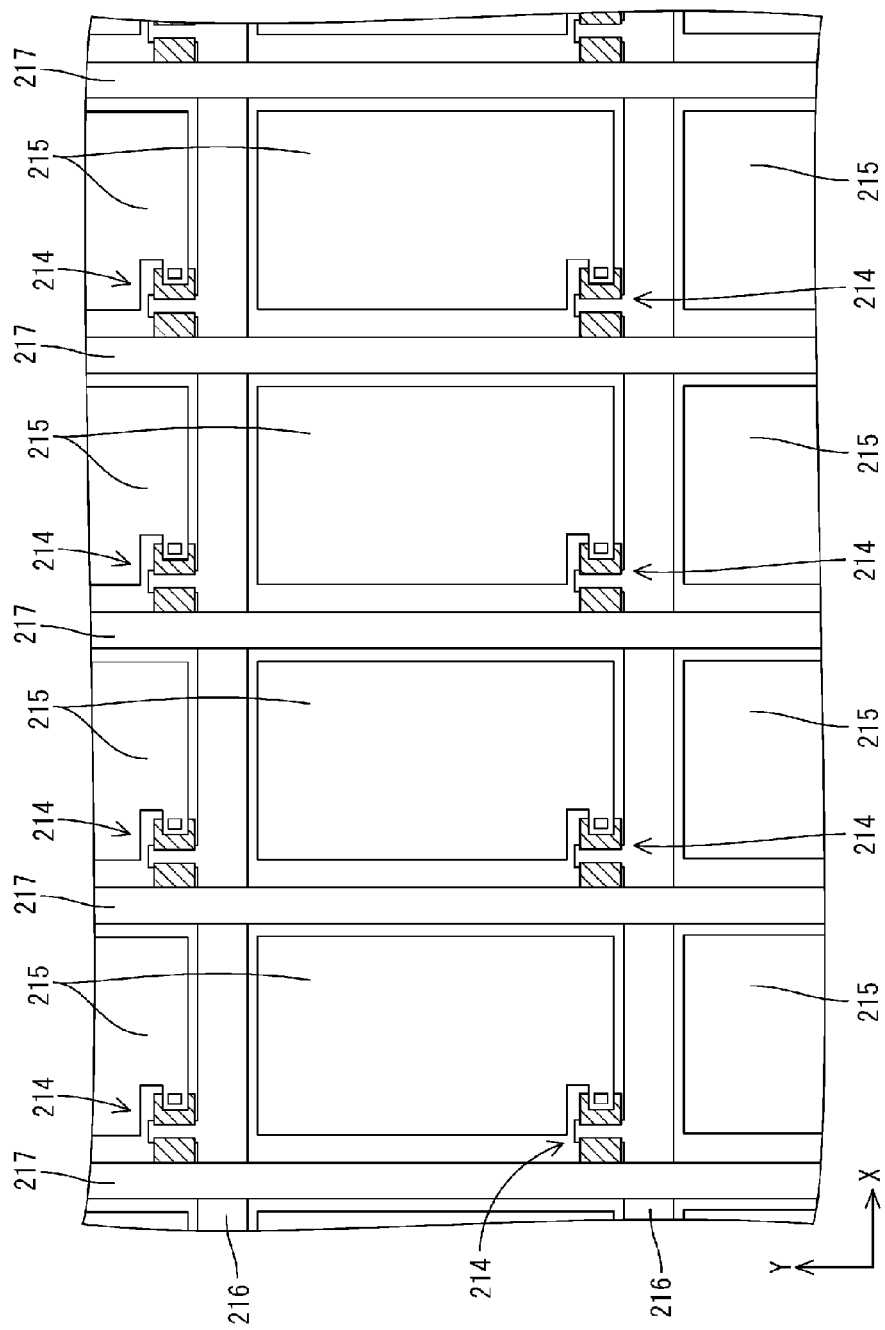
FIG. 29 is a magnified plan view showing a plan view configuration of an array substrate according to Embodiment 16 of the present invention.

(11) In the embodiments above, the configuration in which the areas of the respective colored portions R, G, B, and Y that constitute the color filters were different from each other was described as an example, but it is also possible to configure the respective colored portions R, G, B, and Y so as to be equal in area. Specifically, as shown in FIG. 28, the respective colored portions R, G, B, and Y are arranged in a matrix with the X axis direction as the row direction and the Y axis direction as the column direction, the row direction (X axis direction) sizes of the respective colored portions R, G, B, and Y are the same, and the column direction (Y axis direction) sizes thereof are also the same. Accordingly, the areas of the respective colored portions R, G, B, and Y are the same as each other. When the color filters have such a configuration as described above, in the array substrate, as shown in FIG. 29, the row direction sizes of the respective pixel electrodes 215 facing the respective colored portions R, G, B, and Y are all the same, and the column direction sizes are all the same, and thus, all pixel electrodes 215 have the same size and same area. Also, the gate wiring lines 216 and the source wiring lines 217 are all respectively disposed at the same pitch.

(12) In the above-mentioned (11), it is also possible to arrange the respective colored portions R, G, B, and Y in a manner similar to the above-mentioned (4) to (6).

(13) It is also possible to apply the configurations described in the above-mentioned (7) and (8) to the configurations described in the above-mentioned (9) and (11), respectively.

Figure 30:
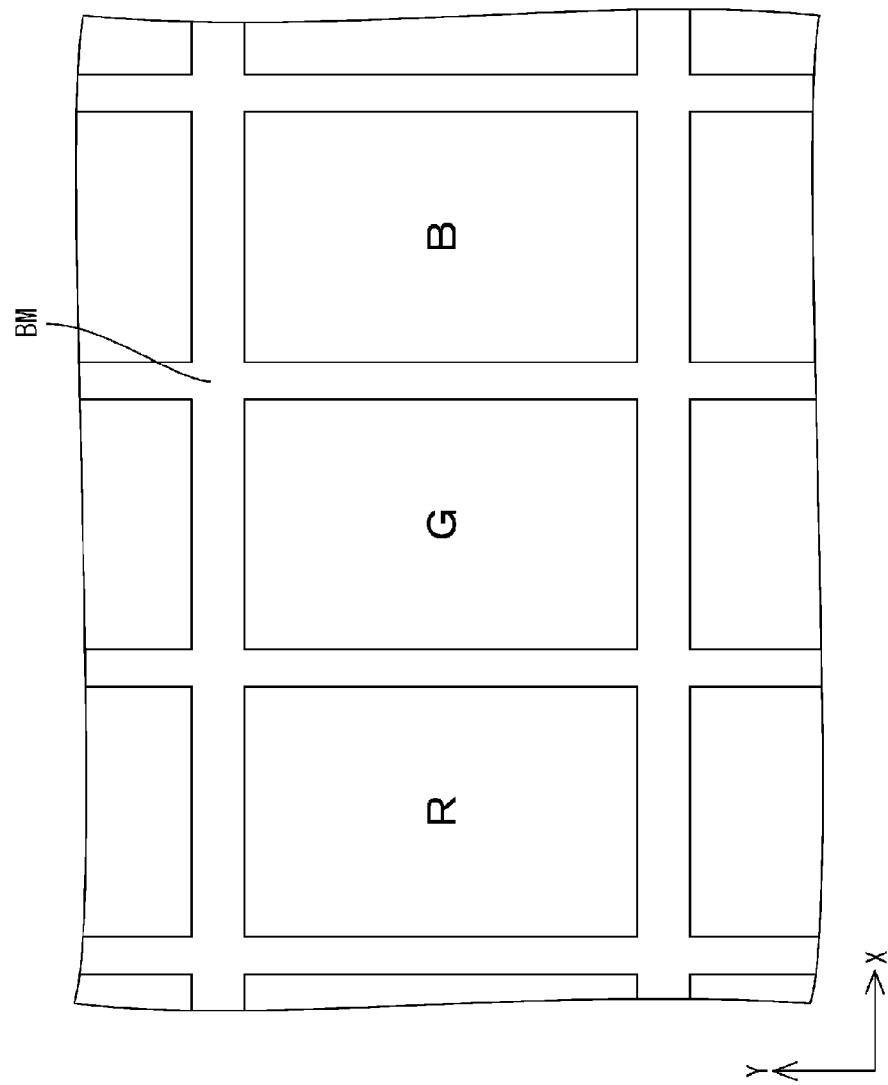
FIG. 30 is a magnified plan view showing a plan view configuration of a CF substrate according to Embodiment 17 of the present invention.

(14) In the embodiments above, the colored portions of the color filters had four colors, but as shown in FIG. 30, the present invention also includes a configuration in which only red (R), green (G), and blue (B), which are the three primary colors of light, are provided, omitting the yellow colored portions. In such a case, it is preferable that the area of the respective colored portions R, G, and B be the same as each other.

Figure 31:
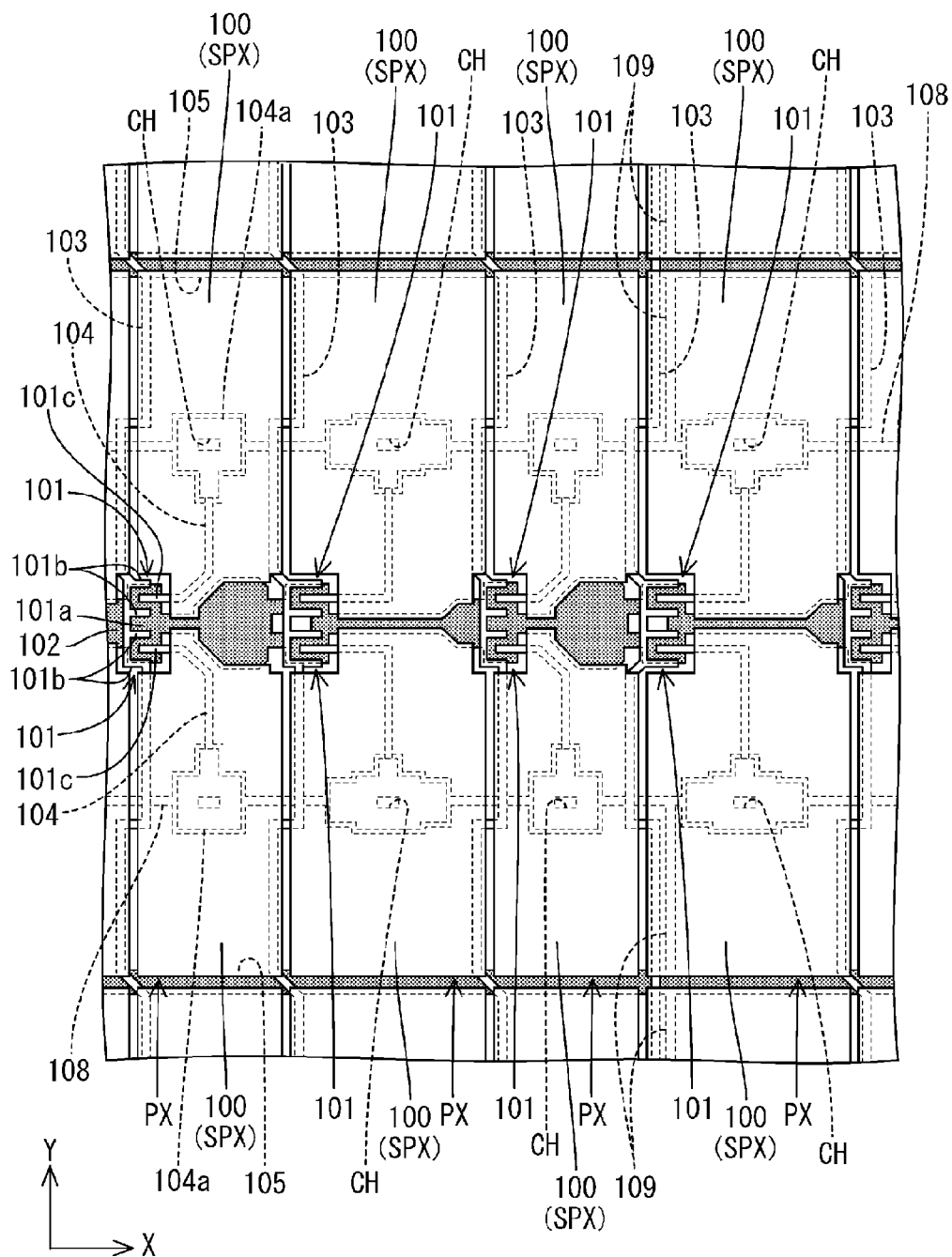
FIG. 31 is a magnified plan view showing a plan view configuration of an array substrate according to Embodiment 18 of the present invention.

(15) In the embodiments above, the configuration of the pixels was described with reference to simplified figures (FIGS. 4 and 5), but in addition to the configuration disclosed in these figures, the specific configuration of the pixels can be modified. For example, the present invention can also be applied to the configuration that conducts so-called multi-pixel driving in which each pixel is divided into a plurality of subpixels, and these subpixels are driven such that gradation values thereof are different from each other. As shown in FIG. 31, in the specific configuration thereof, one pixel PX is constituted of a pair of subpixels SPX, and the pair of subpixels SPX are constituted of a pair of pixel electrodes 100 adjacent to each other across a gate wiring line 102. On the other hand, on the gate wiring line 102, a pair of TFTs 101 is formed for the pair of pixel electrodes 100. The TFTs 101 are each constituted of a gate electrode 101a, which is a portion of the gate wiring line 102, a source electrode 101b constituted of a pair of branched lines branching from the source wiring line 103 and disposed over the gate electrode 101a, and a drain electrode 101c disposed over the gate electrode 101a and between a pair of source electrodes 101b, and a pair of TFTs 101 are arranged along the direction in which a pair of subpixels SPX constituting one pixel PX are arranged over the gate wiring line 102 (Y axis direction). The drain wiring line 104 has, on one end thereof, a contact portion 104a connected to the pixel electrode 100, and the other end of the drain wiring line 104 is connected to the drain electrode 101c of the TFT 101. The contact portion 104a and the pixel electrode 100 are connected via a contact hole CH formed in an interlayer insulating film (not shown in drawings) interposed therebetween, with both the contact portion 104a and the pixel electrode 100 being at the same potential. On the other hand, at the pair of the pixel electrodes 100, an auxiliary capacitance wiring line 105 is disposed at an end of each pixel electrode on the side opposite to the gate wiring line 102 so as to overlap each pixel electrode in a plan view, and the auxiliary capacitance wiring line 105 forms a capacitance with the corresponding pixel electrode 100. In other words, the respective two pixel electrodes 100 that constitute one pixel PX form capacitance with the different auxiliary capacitance wiring lines 105. In addition, between the gate wiring line 102 and each auxiliary capacitance wiring line 105, in-pixel auxiliary capacitance wiring lines 108 are respectively formed so as to be parallel to the gate wiring line 102 and the auxiliary capacitance wiring line 105 and so as to be formed across the respective pixel electrodes 100 and the respective contact portions 104a. The respective in-pixel auxiliary capacitance wiring lines 108 are connected to the respective auxiliary capacitance wiring lines 105 disposed opposite to the gate wiring lines 102 through connecting wiring lines 109, and thus, the in-pixel auxiliary capacitance wiring lines 108 are at the same potential as the respective auxiliary capacitance wiring lines 105. Therefore, the in-pixel auxiliary capacitance wiring lines 108, which are at the same potential as the auxiliary capacitance wiring lines 105, form a capacitance between the in-pixel auxiliary capacitance wiring lines 108 and the respective contact portions 104a, which overlap the respective in-pixel auxiliary capacitance wiring lines 108 in a plan view and are at the same potential as the respective pixel electrodes 100. With respect to driving, a gate wiring line 102 and a source wiring line 103 common to each pair of TFTs 101 respectively supply a scanning signal and a data signal to the pair of TFTs 101, and different signals (potentials) are supplied to the respective auxiliary capacitance wiring lines 105 and the respective in-pixel auxiliary capacitance wiring lines 108, which respectively overlap the pair of pixel electrodes 100 and the pair of contact portions 104a connected thereto. Thus, it is possible to have the voltage charged to the subpixels SPX, or in other words, the gradation value, be different. With this configuration, it is possible to conduct so-called multi-pixel driving, and it is possible to have excellent viewing angle characteristics.

Figure 32:
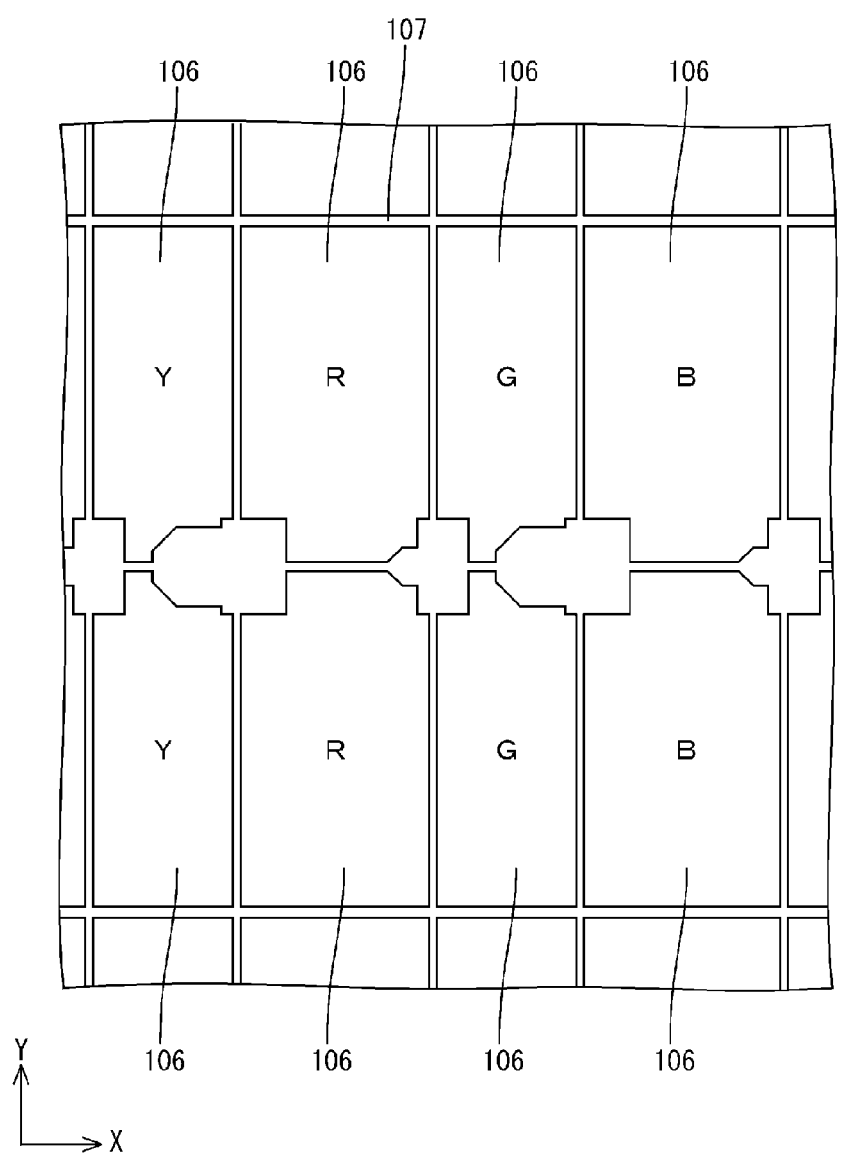
FIG. 32 is a magnified plan view showing a plan view configuration of a CF substrate according to Embodiment 18 of the present invention.

In the pixel configuration for conducting the above-mentioned multi-pixel driving, the respective pixel electrodes 100 and the respective colored portions R, G, B, and Y of the color filters 106, which face the respective pixel electrodes 100, have the following configuration. That is, as shown in FIG. 32, the color filters 106 are constituted of the colored portions of four colors R, G, B, and Y, and the yellow colored portion Y, the red colored portion R, the green colored portion G, and the blue colored portion B are repeatedly arranged in a row in this order from the left side of the figure along the X axis direction. The respective colored portions R, G, B, and Y are divided by a light-shielding layer (black matrix) 107, and the light-shielding layer 107 is arranged in a substantially grid pattern, overlapping the gate wiring lines 102, the source wiring lines 103, and the auxiliary capacitance wiring lines 105 in a plan view. Of the colored portions R, G, B, and Y, the yellow colored portion Y and the green colored portion G have almost the same size in the X axis direction (direction at which the colored portions R, G, B, and Y are arranged), whereas the red colored portion R and the blue colored portion B have an X axis direction size greater than the yellow colored portion Y and the green colored portion G (approximately 1.3 times to 1.4 times, for example). More specifically, the size of the red colored portions R along the X axis direction is slightly larger than the size of the blue colored portions B. As shown in FIG. 31, the respective pixel electrodes 100 have substantially the same size as each other with respect to the Y axis direction, but with respect to the X axis direction, the pixel electrodes 100 have the sizes that correspond to the sizes of the colored portions R, G, B, and Y of the color filters 106 that face the respective pixel electrodes 100.

DESCRIPTION OF REFERENCE CHARACTERS 10, 10A, 10B, 10C, 10D, 10E, 10F, 10G liquid crystal display device (display device)
11 liquid crystal panel (display panel)
12, 12A, 12B, 12C, 12D, 12E, 12F, 12G backlight device (illumination device)
13 bezel
14 TFT
22 chassis (housing member)
22a bottom plate
22b side wall
23 optical sheets
23d outer edge
24 LED (light source)
25 LED substrate (light source substrate)
25a substrate surface
26 light guide plate
26a front surface of light guide plate 26b side edge face of light guide plate
26c rear surface of light guide plate
27 frame
33 heat dissipation member (first support member)
33a first attaching part
33b first standing wall
X, X1, X2, X3, X4, X5, X6, X7 circulation hole
S1 air space

The invention claimed is:

1. An illumination device, comprising:
a housing member having a bottom plate and side walls that rise up from the bottom plate;
a light guide plate having a front surface from which light inputted from a side edge face of the light guide plate is outputted, and a rear surface that faces the bottom plate of the housing member, the light guide plate being disposed on an inner side of the side walls such that a space is formed between the side edge face of the light guide plate and one of the side walls of the housing member facing the side edge face;
a light source unit provided with light sources and a light source substrate having the light sources mounted on a substrate surface thereof, the substrate surface facing the side edge face of the light guide plate, the light source unit being disposed in said space such that a gap is formed between the substrate surface of the light source substrate and the side edge face;
an optical sheet disposed on the front surface of the light guide plate, the optical sheet having an outer edge that protrudes from the side edge face of the light guide plate in a plan view towards the light source substrate to cover the bottom plate at said gap; and
a first support member that includes a flat first attaching part fixed onto the bottom plate such that a front end of the first attaching part is interposed between the bottom plate and the light guide plate and a rear end of the first attaching part is disposed within the space between the one of the side walls and the side edge face, and a flat first standing wall that rises from the rear end of the first attaching part, the first standing wall having the light source substrate fixed thereto, thereby allowing the light source unit to be disposed within said space,
wherein a circulation hole is formed in at least one of the light source substrate and the housing member such that an air space surrounded by the side edge face of the light guide plate, the substrate surface of the light source substrate, the bottom plate of the housing member, and the outer edge of the optical sheet communicates with an outside of the illumination device, and
wherein the circulation hole is formed through the light source substrate, the first standing wall, and one of the side walls, and has a first section of the circulation hole formed through the light source substrate and the first standing wall, and a second section of the circulation hole formed through the one of the side walls are provided with a spatial offset in a plane perpendicular to their direction of protrusion.

2. A display device, comprising the illumination device according to claim 1; and a display panel that performs display using light from the illumination device according to claim 1.

3. The display device according to claim 2, wherein the display panel is a liquid crystal panel that uses liquid crystal.

4. The illumination device according to claim 1, wherein the first support member is made of a heat dissipation member.

5. An illumination device, comprising:
a housing member having a bottom plate and side walls that rise up from the bottom plate;
a light guide plate having a front surface from which light inputted from a side edge face of the light guide plate is outputted, and a rear surface that faces the bottom plate of the housing member, the light guide plate being disposed on an inner side of the side walls such that a space is formed between the side edge face of the light guide plate and one of the side walls of the housing member facing the side edge face;
a light source unit provided with light sources and a light source substrate having the light sources mounted on a substrate surface thereof, the substrate surface facing the side edge face of the light guide plate, the light source unit being disposed in said space such that a gap is formed between the substrate surface of the light source substrate and the side edge face;
an optical sheet disposed on the front surface of the light guide plate, the optical sheet having an outer edge that protrudes from the side edge face of the light guide plate in a plan view towards the light source substrate to cover the bottom plate at said gap; and
a second support member including a flat second attaching part that is fixed onto the bottom plate such that a front end and a rear end thereof are both disposed within the space, and a flat second standing wall that rises from the front end of the second attaching part, the second standing wall having the light source substrate fixed thereto, thereby allowing the light source unit to be disposed within the space,
wherein the circulation hole is formed through the light source substrate, the second standing wall, and one of the side walls, and a first section of the circulation hole that is formed through the light source substrate and the second standing wall, and a second section of the circulation hole that is formed through the one of the side walls are provided with a spatial offset in a plane perpendicular to their direction of protrusion.

6. A display device, comprising the illumination device according to claim 5; and a display panel that performs display using light from the illumination device according to claim 5.

7. The display device according to claim 6, wherein the display panel is a liquid crystal panel that uses liquid crystal.

8. The illumination device according to claim 5, wherein the second support member is made of a heat dissipation member.

* * * * *